United States Patent
Cagle

(10) Patent No.: US 10,456,879 B2
(45) Date of Patent: Oct. 29, 2019

(54) REAR SHOCK TRAM GAUGE

(71) Applicant: Allen Cagle, Folsom, CA (US)

(72) Inventor: Allen Cagle, Folsom, CA (US)

( * ) Notice: Subject to any disclaimer, the term of this patent is extended or adjusted under 35 U.S.C. 154(b) by 0 days.

(21) Appl. No.: 15/597,844

(22) Filed: May 17, 2017

(65) Prior Publication Data

US 2018/0029177 A1 Feb. 1, 2018

Related U.S. Application Data

(63) Continuation-in-part of application No. 14/727,529, filed on Jun. 1, 2015, now Pat. No. 9,733,065, which is a continuation-in-part of application No. 13/839,542, filed on Mar. 15, 2013, now Pat. No. 9,073,109.

(60) Provisional application No. 61/639,901, filed on Apr. 28, 2012.

(51) Int. Cl.
| | |
|---|---|
| *G01B 3/20* | (2006.01) |
| *B23P 19/10* | (2006.01) |
| *G01B 5/00* | (2006.01) |
| *G01B 11/24* | (2006.01) |
| *B21D 1/14* | (2006.01) |
| *B25H 1/00* | (2006.01) |
| *G01B 11/02* | (2006.01) |
| *B21D 53/86* | (2006.01) |

(52) U.S. Cl.
CPC .............. *B23P 19/10* (2013.01); *B21D 1/14* (2013.01); *B25H 1/0014* (2013.01); *G01B 3/20* (2013.01); *G01B 5/0025* (2013.01); *G01B 11/02* (2013.01); *G01B 11/24* (2013.01); *B21D 53/86* (2013.01); *Y10T 29/49618* (2015.01)

(58) Field of Classification Search
CPC ................................. G01B 3/20; G01B 3/08
USPC ........ 33/1 BB, 806, 809, 810, 811, 812, 608
See application file for complete search history.

(56) References Cited

U.S. PATENT DOCUMENTS

| | | | | |
|---|---|---|---|---|
| 3,000,102 | A | * | 9/1961 | Snyder ..................... G01B 3/20 33/679.1 |
| 3,562,773 | A | * | 2/1971 | Wilamowski ............ G01B 3/00 33/812 |
| 4,015,339 | A | * | 4/1977 | Horvallius ........... G01B 5/0025 33/288 |
| 4,088,002 | A | | 5/1978 | Andrew |
| 4,432,144 | A | | 2/1984 | Carlsson |

(Continued)

FOREIGN PATENT DOCUMENTS

| | | |
|---|---|---|
| DE | 19810140 A1 | 3/1998 |
| EP | 0458268 A2 | 5/1991 |

(Continued)

OTHER PUBLICATIONS

International Preliminary Report on Patentability from PCT Application No. PCT/US2016/035339, dated Dec. 14, 2017.

(Continued)

*Primary Examiner* — Christopher W Fulton
(74) *Attorney, Agent, or Firm* — Haverstock & Owens LLP

(57) ABSTRACT

A motorcycle frame rack enables a motorcycle frame to be repaired without removing many components from the motorcycle. A motorcycle is positioned on the motorcycle frame rack, secured in place and then the frame is adjusted using chains coupled to towers. A self-centering laser measuring system is able to be used to analyze and measure damage to the motorcycle frame.

11 Claims, 24 Drawing Sheets

(56) References Cited

U.S. PATENT DOCUMENTS

| | | | |
|---|---|---|---|
| 4,603,570 A | 8/1986 | Dehn | |
| 4,615,618 A | 10/1986 | Bailey et al. | |
| 4,621,435 A | 11/1986 | Higginbotham | |
| 4,691,443 A | 9/1987 | Hamilton et al. | |
| 4,731,931 A * | 3/1988 | Goodman | G01B 3/20 33/520 |
| 4,731,936 A | 3/1988 | Aldrich et al. | |
| 4,843,720 A * | 7/1989 | Kim | A61B 5/107 33/512 |
| 4,997,283 A | 3/1991 | Danielson et al. | |
| 5,027,524 A | 7/1991 | Metcalf et al. | |
| 5,029,397 A | 7/1991 | Palombi | |
| 5,038,493 A * | 8/1991 | Stabs | G01B 3/08 33/809 |
| 5,125,164 A | 6/1992 | Fournier et al. | |
| 5,175,941 A * | 1/1993 | Ziegler | G02C 13/003 33/200 |
| 5,417,094 A | 5/1995 | Chisum | |
| 5,507,101 A * | 4/1996 | Mason | B60S 5/00 33/288 |
| 5,509,208 A | 4/1996 | Oja | |
| 5,515,613 A | 5/1996 | Hinson | |
| 5,644,854 A | 7/1997 | Bergeron | |
| 5,647,139 A | 7/1997 | Richardson | |
| 5,931,360 A | 8/1999 | Reichert | |
| 6,240,648 B1 | 6/2001 | Dolph | |
| 6,347,457 B1 | 2/2002 | Espinoza et al. | |
| 7,059,060 B1 * | 6/2006 | Baumgartner | A61B 5/1072 33/494 |
| 7,120,524 B2 | 10/2006 | Srack et al. | |
| 7,600,408 B2 | 10/2009 | Potter et al. | |
| 7,874,080 B1 * | 1/2011 | Morales | G01B 5/14 33/600 |
| 8,763,269 B2 * | 7/2014 | Buckland | G01B 5/14 33/512 |
| 9,073,109 B2 | 7/2015 | Cagle | |
| 9,428,923 B1 * | 8/2016 | Christner | E04F 21/0015 |
| 9,694,406 B2 | 7/2017 | Cagle | |
| 2002/0051703 A1 | 5/2002 | Clary | |
| 2002/0062677 A1 | 5/2002 | Ballard et al. | |
| 2002/0088128 A1 | 7/2002 | Bremer | |
| 2005/0235731 A1 | 10/2005 | Hess et al. | |
| 2009/0249632 A1 | 10/2009 | Tyler et al. | |
| 2009/0322006 A1 | 12/2009 | Potter | |
| 2011/0113640 A1 * | 5/2011 | Molina | G01B 3/205 33/608 |
| 2013/0283876 A1 | 10/2013 | Cagle | |
| 2013/0286405 A1 | 10/2013 | Cagle | |
| 2015/0260508 A1 | 9/2015 | Cagle | |
| 2017/0312807 A1 | 11/2017 | Cagle | |

FOREIGN PATENT DOCUMENTS

| | | |
|---|---|---|
| EP | 0846944 A1 | 6/1998 |
| EP | 0945333 B1 | 9/1999 |

OTHER PUBLICATIONS

Office Action from U.S. Appl. No. 13/839,293, dated Jan. 14, 2015.
Office Action from U.S. Appl. No. 13/839,293, dated Apr. 27, 2015.
Office Action from U.S. Appl. No. 13/839,293, dated Aug. 25, 2015.
The International Search Report and Written Opinion of the International Searching Authority, or the Declaration for PCT Application No. PCT/US18/33015 dated Aug. 7, 2018.
Lopez, Ernie; "Back on the Road", Jun. 2005, Hot Bike, vol. 37 No. 6, pp. 66-72.

* cited by examiner

This Point Lower is Universal Straight Shooter

REAR SHOCK TRAM GAUGE

CROSS-REFERENCE TO RELATED APPLICATION(S)

This application is a continuation-in-part application of U.S. patent application Ser. No. 15/597,817, filed May 17, 2017, titled "LASER MEASURING SYSTEM FOR MOTORCYCLE FRAME REPAIR," (now U.S. Pat. No. 10,022,777), which is a continuation-in-part application of U.S. patent application Ser. No. 14/727,529, filed Jun. 1, 2015, and titled "LASER MEASURING SYSTEM FOR MOTORCYCLE FRAME REPAIR," (now U.S. Pat. No. 9,733,065), which is a continuation-in-part application of U.S. patent application Ser. No. 13/839,542, filed Mar. 15, 2013, and titled "SELF-CENTERING LASER MEASURING SYSTEM FOR MOTORCYCLE FRAME REPAIR," (now U.S. Pat. No. 9,073,109), which claims priority under 35 U.S.C. § 119(e) of the U.S. Provisional Patent Application Ser. No. 61/639,901, filed Apr. 28, 2012 and titled, "MOTORCYCLE FRAME RACK," which are all hereby incorporated by reference in their entireties for all purposes.

FIELD OF THE INVENTION

The present invention relates to the field of motorcycles. More specifically, the present invention relates to motorcycle repair.

BACKGROUND OF THE INVENTION

Until the mid 1970's, if a car was in an accident and sustained frame damage, the car was deemed a "total" economical loss by the insurance companies. They totaled the cars because the technology, equipment and information and training were not yet available to repair shops. That has all changed. By the mid 1980's most reputable body shops had a frame rack.

Representatives from various insurance companies are becoming frustrated with totaling motorcycles without knowing for sure how badly the frames are bent, especially when they can see there is minimal frame damage.

There are only five motorcycle frame shops in all of the United States, one in Arizona and four in California.

The first two are in Sacramento and Anaheim. These two shops use what is known as a peg board system. This system requires the motorcycle to be stripped down. This procedure requires several hours of labor, and they cannot provide documentation, before and after specifications or show the customer a print out that the frame is straight. This is a problem for the insurance companies. They want documentation for their records for any repairs that were performed. Another problem is these two shops require approximately eight weeks before a user gets the motorcycle back.

The other shops are located in San Bruno and Englewood, Calif. and one in Arizona. The equipment they use is called a Motojig. This is a "bench" system made in Italy which is an old and antiquated automobile frame rack in which the motorcycle has to be lifted with a hoist to be put on the "bench." It is a cumbersome, time consuming piece of equipment.

Right now, if a user's motorcycle gets hit while parked or gets involved in a motorcycle accident in California, the bike gets towed to the dealership for repairs. The dealership strips the bike down and pays to have it transported to and from one of the frame shops at a cost to the customer and/or the insurance company.

There are more men and women riding motorcycles than ever before. Some ride to commute and/or ride for economic reasons, some ride for the sport and the thrill of it, while others ride for the lifestyle. The fact of the matter is there has never been this many people riding motorcycles in the streets.

According to the National Highway Traffic Safety Administration as of Dec. 31, 2010, there are over 900,000 registered motorcycles in California alone. There are over 600,000 people a year in the United States that register for a Motorcycle safety course through the Motorcycle Safety Foundation. This is just one of the many accredited Motorcycle safety Schools in the United States. With the price of gasoline going up every other week there are more and more people riding motorcycles and not just nationwide but worldwide.

Additionally, there are thousands of people who race motorcycles all over the world. There are super sport road racers, café racers, the mile, drag racing, TT, flat track, short track, enduro, and all kinds of motor cross, super cross and dirt track races being held all over the world.

With all of these races, there are teams of mechanics and technicians with truck loads of tools and equipment for mechanical repairs and adjustments.

SUMMARY OF THE INVENTION

With the growing popularity of motorcycles and similar modes of transportation, the need for a device and method of repairing the motorcycle's frame is great. A motorcycle frame rack including universal mounting brackets to perform any motorcycle frame repair enables a technician to straighten a motorcycle frame or make a neck rake adjustment much faster and much more cost effectively than replacing the frame.

In one aspect, a laser measuring system for measuring a motorcycle frame comprises a central laser, a plurality of outer lasers, a body to which the central laser and the plurality of outer lasers are attached, the body configured for coupling to a motorcycle and a mount configured for coupling to the motorcycle, wherein the mount is further configured for use with the central laser or the plurality of outer lasers to measure the motorcycle frame. The mount includes a magnetic universal lower tree mount. The magnetic universal lower tree mount includes a plurality of short tubes and a plurality of long tubes. The plurality of short tubes are configured to diagnose frame damage, and the plurality of long tubes are configured to validate the magnetic universal lower tree mount is centered on the motorcycle frame. The magnetic universal lower tree mount attaches to a universal magnetic neck bracket to attach to the motorcycle frame. The mount includes a plurality of shock target mounts which are configured to be positioned on left and right rear shocks of the motorcycle. The body comprises a plurality of side components and a central component, wherein the plurality of side components move equidistantly towards or away from the central component.

In another aspect, a method of utilizing a laser measuring system comprises mounting a mount to a motorcycle, aligning a universal mounting laser device with the mount and using one or more lasers of the universal mounting laser device and the mount to analyze the motorcycle frame. The mount includes a magnetic universal lower tree mount. The magnetic universal lower tree mount includes a plurality of short tubes and a plurality of long tubes. The plurality of short tubes are configured to diagnose frame damage, and the plurality of long tubes are configured to validate the magnetic universal lower tree mount is centered on the motorcycle frame. The magnetic universal lower tree mount attaches to a universal magnetic neck bracket to attach to the motorcycle frame. The mount includes a plurality of shock target mounts which are configured to be positioned on left and right rear shocks of the motorcycle. Using the one or more lasers of the universal mounting laser device to analyze the motorcycle frame includes measuring defects in the motorcycle frame. Using the one or more lasers of the universal mounting laser device to analyze the motorcycle frame includes aiming the lasers at targets of the motorcycle frame. The method further comprises adjusting the motorcycle frame with a rack. The method further comprises using the one or more lasers of the universal mounting laser device to re-analyze the motorcycle frame to ensure any damage has been corrected.

In another aspect, a laser measuring system for analyzing a motorcycle comprises a central laser, a plurality of outer lasers, a body to which the central laser and the plurality of outer lasers are attached, the body configured for coupling to a motorcycle and a target tip configured for coupling to the motorcycle, wherein the target tip is further configured for use with the central laser or the plurality of outer lasers to analyze components of the motorcycle. The target tip is coupled to the motorcycle using hot glue. The target tip receives a target, wherein the target comprises a tube. The target tip is configured to be positioned anywhere on the motorcycle.

In another aspect, method of utilizing a laser measuring system comprises attaching a target tip to a motorcycle, aligning a universal mounting laser device with the target tip and using one or more lasers of the universal mounting laser device and the target tip to analyze one or more components of a motorcycle. Attaching the target tip to the motorcycle is by using hot glue. The method further comprises coupling a target with the target tip before or after the target tip is attached to the motorcycle.

DETAILED DESCRIPTION OF THE PREFERRED EMBODIMENT

A motorcycle frame rack (also referred to as the "rack") generally includes one or more towers, a tool board with a universal mounting system and a ramp. In some embodiments, the rack has two towers with ten tons of pulling capability per tower. The pulling capability of the towers is able to be less or greater depending on the need. The universal mounting system mounts and holds steady any make or model motorcycle for frame repair. The ramp is able to be any type of ramp. Examples of ramps include an aluminum ramp or a carbon fiber ramp which are sturdy yet light enough to be picked up and stored when not in use. A dolly and wench system is able to be included to pull a severely damaged motorcycle onto the rack. Any pump is able to operate the two ten ton towers, for example, an electric or hydraulic pump. The rack is able to include a measuring system including a computing device and a printer. The measuring system is able to provide an operator with before and after frame specifications from any motorcycle in the world. The operator is able to measure the motorcycle frame before making the decision to remove a wrecked front end and installing the frame pulling equipment and tooling.

Once the motorcycle is on the frame rack, there are a variety of pull clamps, brackets and/or straps that are able to be used to pull the frame back to factory specifications.

In some embodiments, the rack includes a deck, stand, drop panel, two towers, a two-piece ramp, a dolly, a winch along with a clamp system with numerous tools for mounting motorcycles. There is also a laser measuring system with a rolling stand that will house a computing device, monitor, printer and additional supplies.

Figure 1:
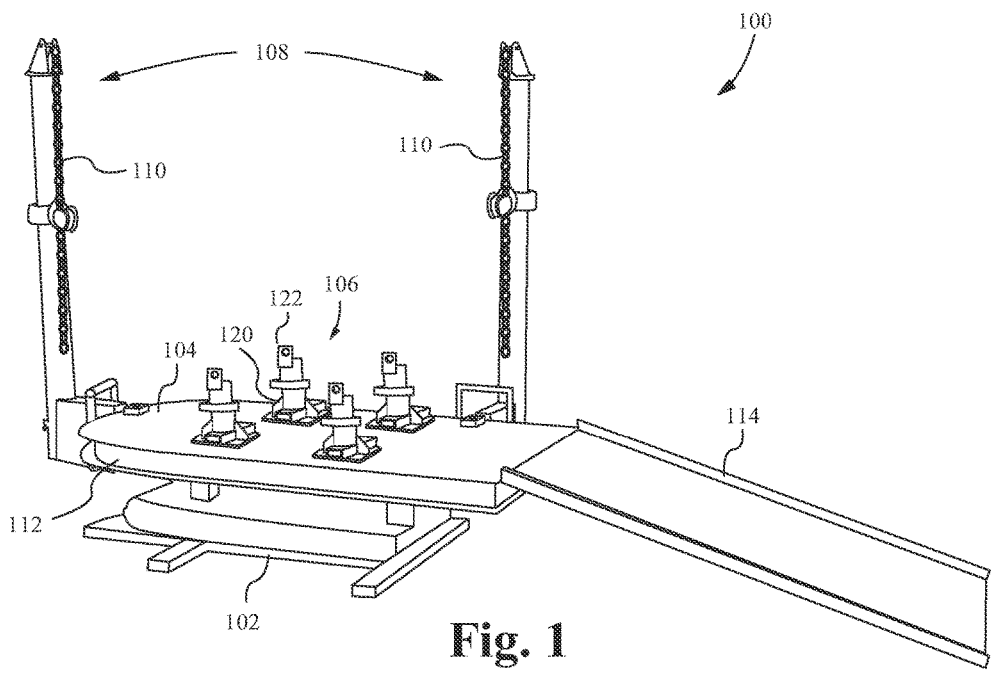
FIG. 1 illustrates a diagram of a rack according to some embodiments.

FIG. 1 illustrates a diagram of a rack according to some embodiments. The rack 100 includes a stand 102 which supports a deck 104 for receiving a motorcycle. The deck 104 includes a universal mounting system 106 for holding the motorcycle in place while the frame of the motorcycle is repaired. The universal mounting system 106 includes a universal clamp 120 and a universal mount 122. One or more towers 108 are positioned on or near the deck 102, and the towers 108 include chains 110 or another pulling mechanism such as a cable. The towers 108 are able to be positioned on a track 112 or path/guide to enable the towers 108 to be moved into a specific position to perform the adjustment of the motorcycle frame. The track 112 permits the towers to slide around the deck 104 while remaining coupled to the deck 104. The towers 108 are able to be locked into place with a locking mechanism. The towers 108 include a mechanism to provide one or more tons of pulling capability. The towers 108 are able to be operated automatically (e.g. by a computing device and/or additional electronics) or manually (e.g. using hydraulics). A ramp 114 is used to allow a motorcycle to be driven or pushed up onto the deck 104. The ramp 114 is able to couple to the deck 104.

Figure 2:
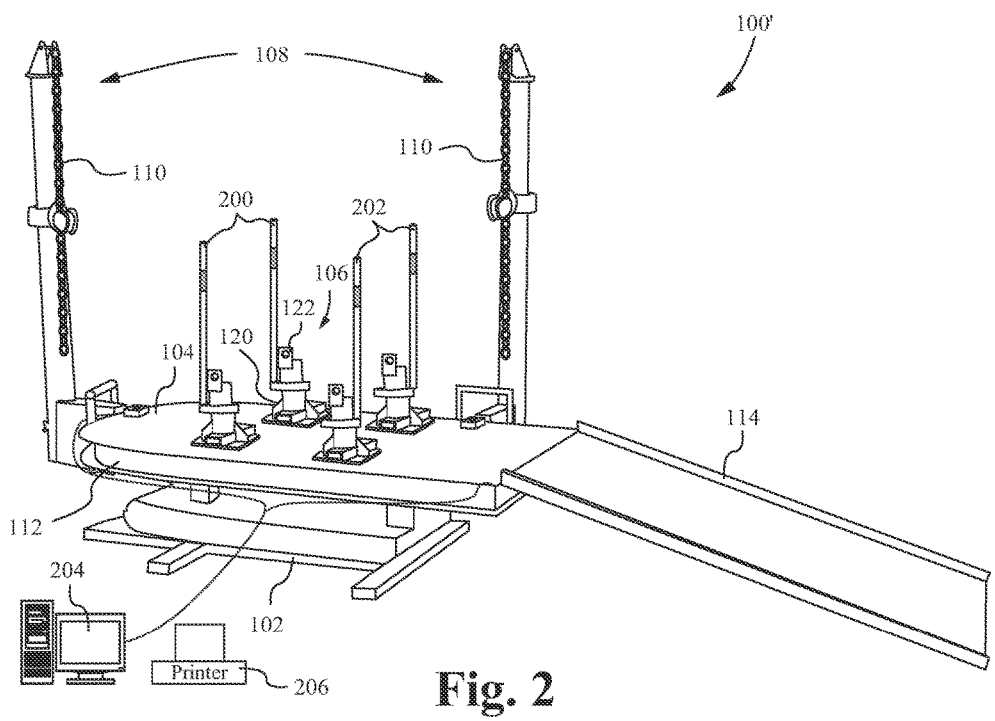
FIG. 2 illustrates a diagram of a rack including a positioning system according to some embodiments.

FIG. 2 illustrates a diagram of a rack including a positioning system according to some embodiments. The rack 100' is similar to the rack 100 of FIG. 1 in that the rack 100' includes a stand 102, a deck 104, a universal mounting system 106, one or more towers 108 with chains 110, a tower track 112 or path/guide and a ramp 114. The rack 100' also includes a measurement system. The measurement system includes a laser measuring and pointing system, a computing device 204 and a printer 206. In some embodiments, the measurement system is implemented without a computing device 204 and printer 206. The laser measuring and pointing system includes a laser transmitter 200 and a laser receiver 202, where the laser transmitter 200 transmits a laser beam and the laser receiver 202 receives the laser beam. The measurement system is able to include one or more laser measuring and pointing systems. In some embodiments, the laser transmitter 200 and the laser receiver 202 are positioned together on a single rod. In some embodiments, the laser measuring and pointing system is coupled to or part of the universal mounting system 106. In some embodiments, the laser measuring and pointing system is coupled to or part of the one or more towers 108. In some embodiments, the laser measuring and pointing system is coupled to or part of the deck 104. The laser measuring and pointing system is able to be movable. In some embodiments, the laser measuring and pointing system is a stand alone device separate from the deck 100. The computing device 204 and the printer 206 are able to include any software or hardware to implement any desired functions such as controlling the towers, analyzing the laser measuring and pointing system data, capturing data, acquiring images for reporting purposes, damage/repair calculations/analysis and any other calculations, functions or data capture/analysis.

Figure 3:
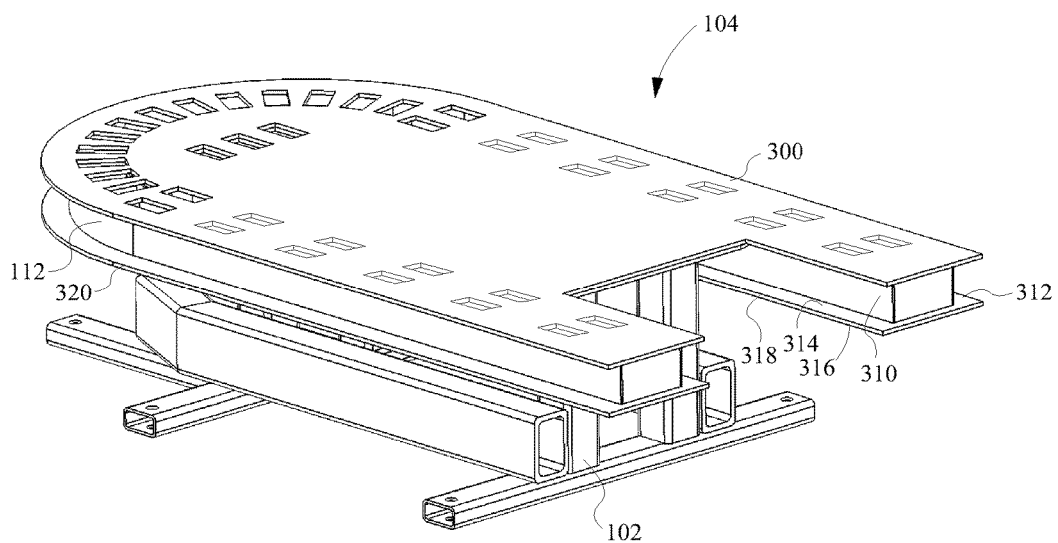
FIG. 3 illustrates a perspective view of a deck according to some embodiments.

FIG. 3 illustrates a perspective view of a deck according to some embodiments. The deck 104 includes a platform 300, several support structures 102 (FIG. 1) and the track 112. As described, the track 112 enables the towers 108 (FIG. 1) to move about the platform 300. The track 112 includes an inner lip 310 and an outer lip 312. Additionally each of the lips include a top surface 314 and a bottom surface 316. There is also an inner lip edge 318 and an outer lip edge 320. The support structures 102 (FIG. 1) are configured in a way to support the weight of the motorcycle as well as enable the repair of the motorcycle frame.

Figure 4:
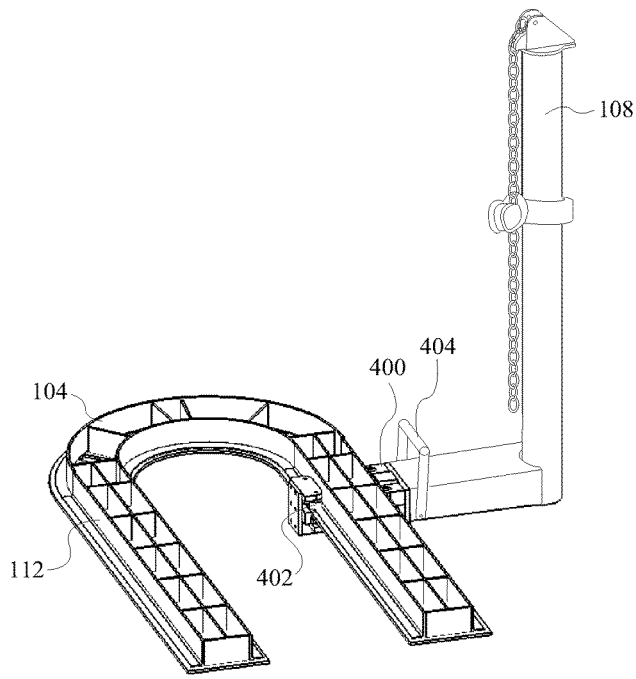
FIG. 4 illustrates a cross section view of a deck and tower according to some embodiments.

FIG. 4 illustrates a cross section view of a deck and tower according to some embodiments. The tower 108 is coupled to the deck 104 with a rolling bracket 400 that includes one or more rollers 402 and is adjustable and lockable using a lever 404. The rollers 402 permit the rolling bracket 400 to be secured to the deck 104 while also having the ability to roll to various locations on the track 112. The lever 404 is able to be used to lock the tower 108 in place. Although FIG. 4 shows a specific implementation of how the tower 108 is coupled to the deck 104, any other configurations are able to be used to couple the tower 108 to the deck 104.

Figure 5:
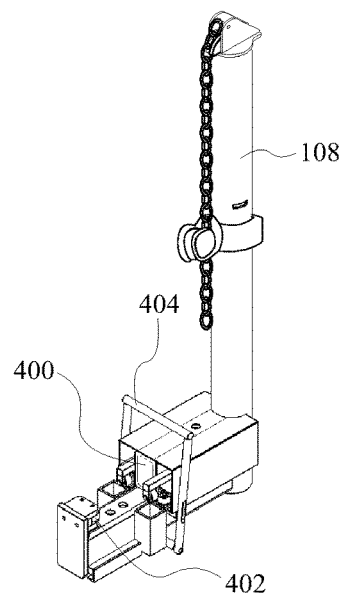
FIG. 5 illustrates a perspective view of a tower with a rolling bracket according to some embodiments.

FIG. 5 illustrates a perspective view of a tower with a rolling bracket according to some embodiments. As described in FIG. 4, the tower 108 includes the rolling bracket 400 with one or more rollers 402. The exemplary rolling bracket 400 shows rollers 402 configured to be positioned above a top surface 314 (FIG. 3) of a lip of the track 112 (FIG. 1) and below a bottom surface 316 (FIG. 3) of the lip of the track 112 (FIG. 1). Further, the rollers 402 are configured to be positioned on each of the inner lip 310 (FIG. 3) and outer lip 312 (FIG. 3) of the track 112 (FIG. 1). Additional rollers are configured to be positioned against the inner lip edge 318 (FIG. 3) and the outer lip edge 320 (FIG. 3). The rollers 402 are able to be any type of rolling mechanism such as wheels or ball bearings.

Figure 6:
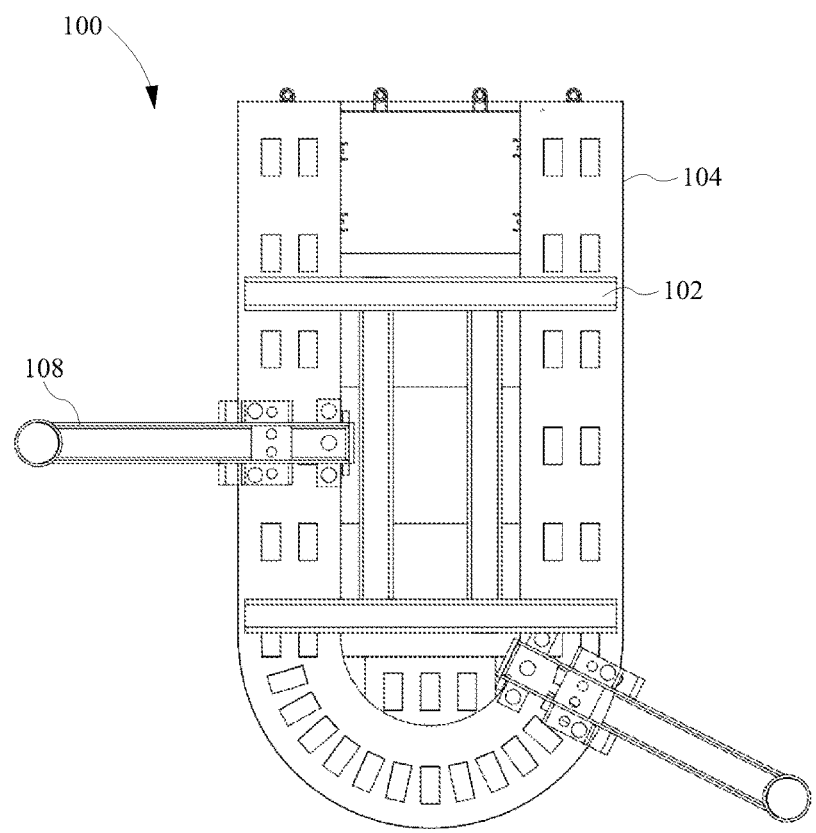
FIG. 6 illustrates a bottom view of the rack according to some embodiments.
Figure 7:
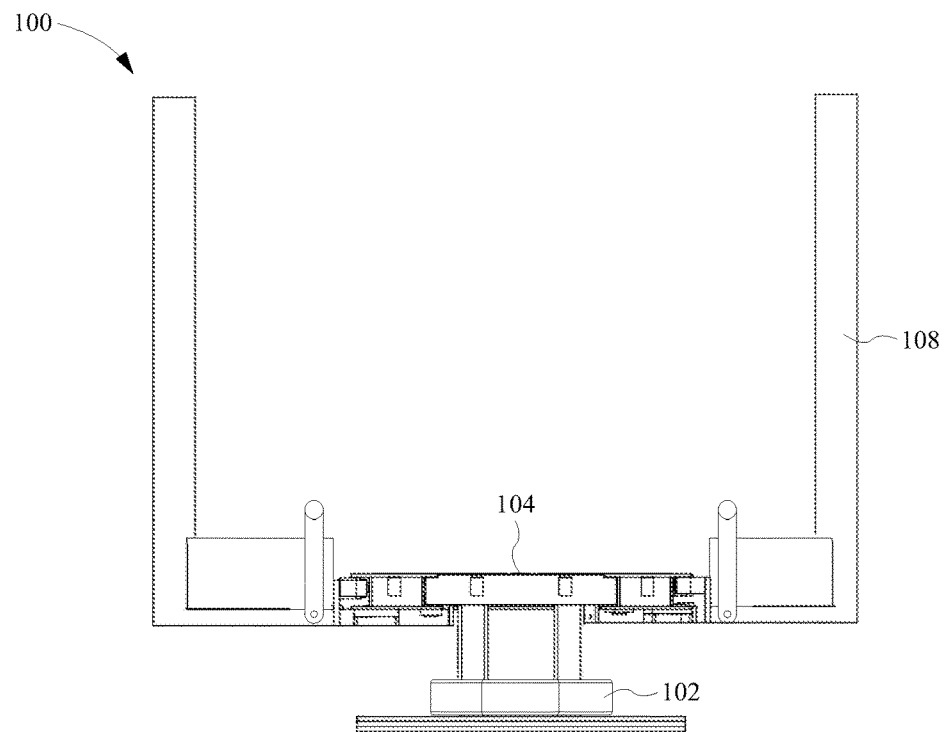
FIG. 7 illustrates a side view of the rack according to some embodiments.
Figure 8:
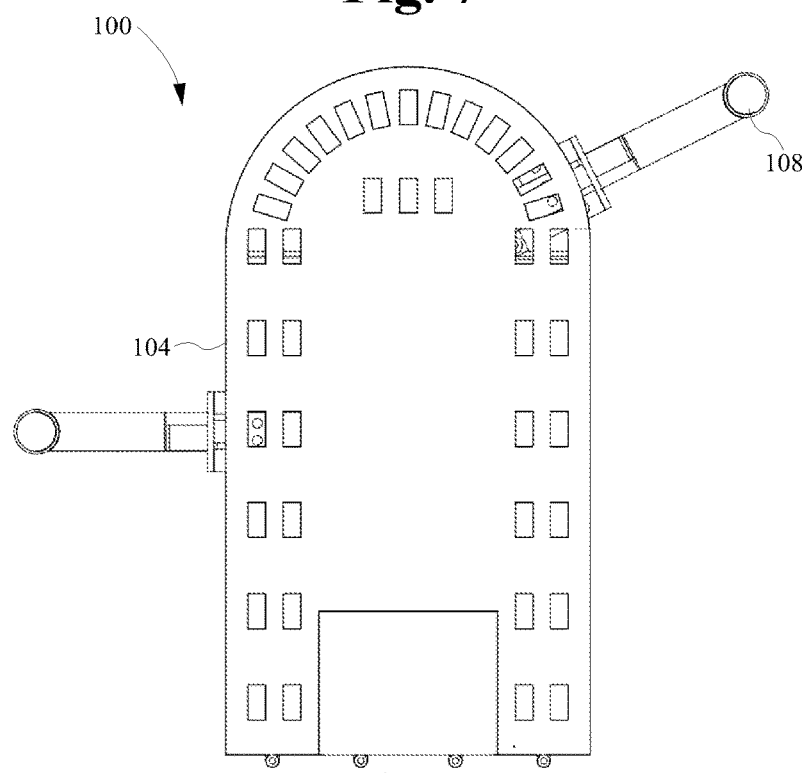
FIG. 8 illustrates a top view of the rack according to some embodiments.

FIG. 6 illustrates a bottom view of the rack according to some embodiments. As shown, the rack 100 includes the deck 104, the towers 108 and the support structure 102. FIG. 7 illustrates a side view of the rack according to some embodiments. As shown, the rack 100 includes the deck 104, the towers 108 and the support structure 102. FIG. 8 illustrates a top view of the rack according to some embodiments. As shown, the rack 100 includes the deck 104 and the towers 108.

Figure 9:
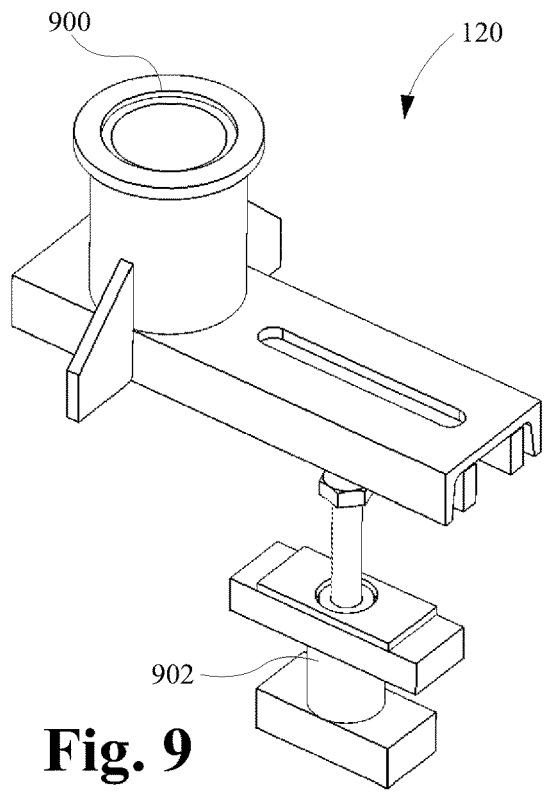
FIG. 9 illustrates a side perspective view of a clamp according to some embodiments.
Figure 10:
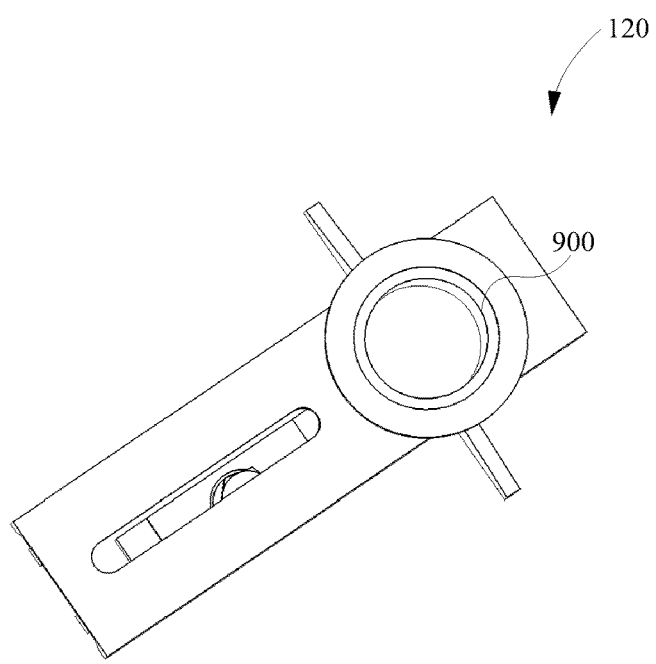
FIG. 10 illustrates a top perspective view of a clamp according to some embodiments.

FIG. 9 illustrates a side perspective view of a clamp according to some embodiments. The clamp 120 includes an aperture 900 for receiving a mount 122 (FIG. 1) and a bracket 902 for insertion into the deck 104 (FIG. 1). FIG. 10 illustrates a top perspective view of a clamp according to some embodiments. As described in FIG. 9, the clamp 120 includes an aperture 900 for receiving a mount 122 (FIG. 1).

Figure 11:
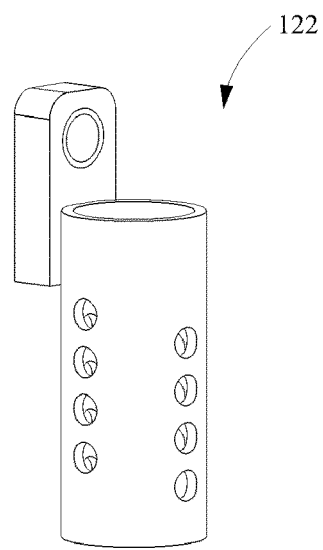
FIG. 11 illustrates a perspective view of a mount according to some embodiments.

FIG. 11 illustrates a perspective view of a mount according to some embodiments. The mount 122 is configured for insertion into the clamp 120 (FIG. 1) and for securing the motorcycle in place.

Figure 12:
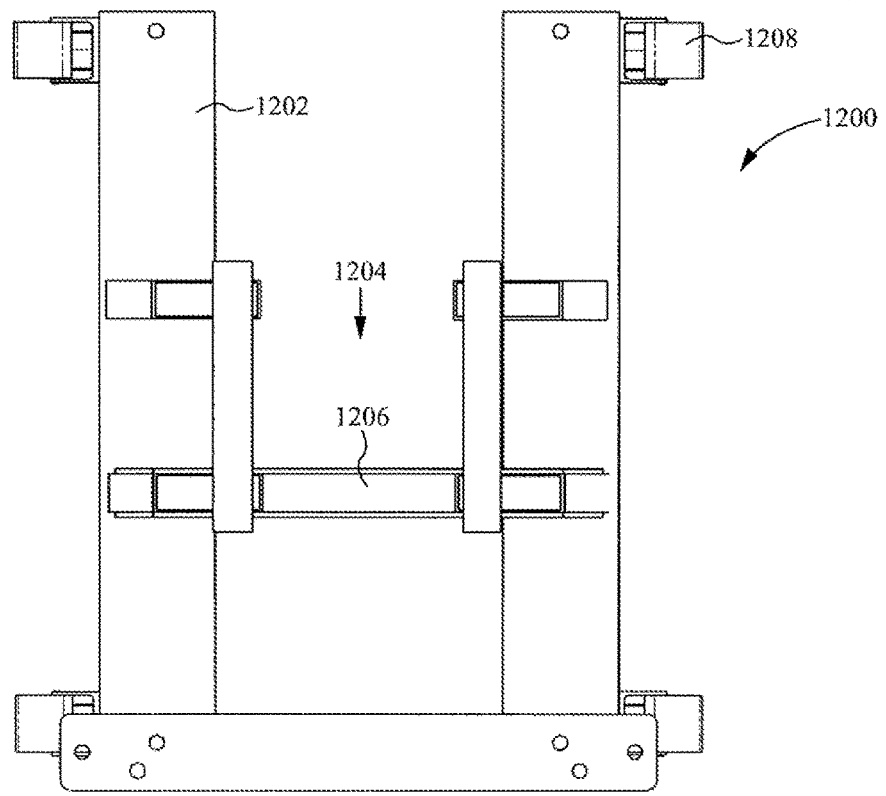
FIG. 12 illustrates a top view of a dolly according to some embodiments.
Figure 13:
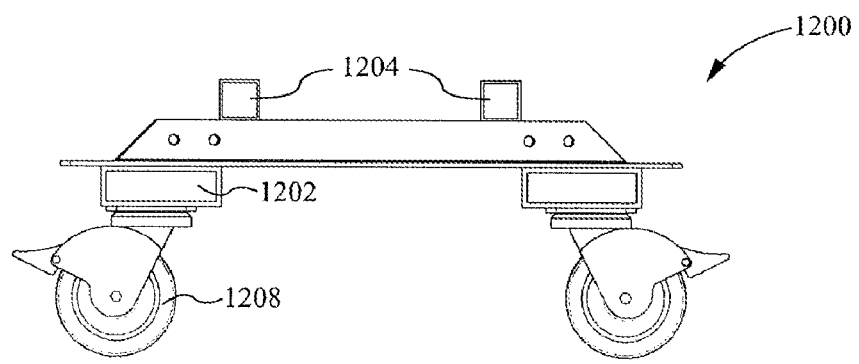
FIG. 13 illustrates a front view of a dolly according to some embodiments.
Figure 14:
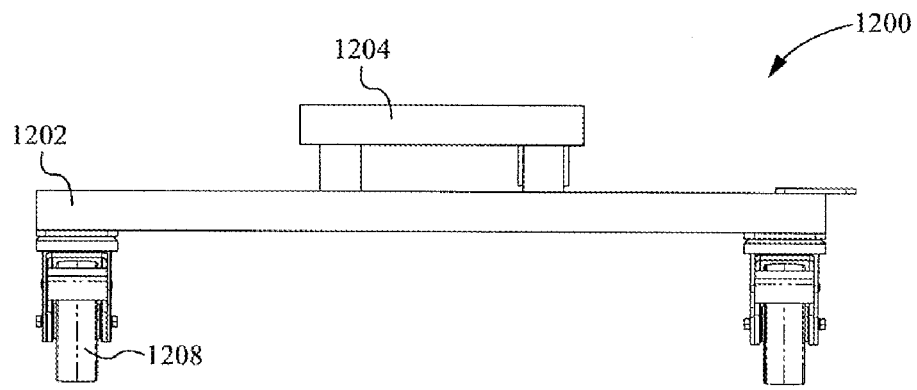
FIG. 14 illustrates a back view of a dolly according to some embodiments.

FIGS. 12-14 illustrate a dolly according to some embodiments. The dolly 1200 includes a base 1202, a top frame 1204, a brace 1206 and a set of wheels 1208. The dolly 1200 is configured to be able to be used to transport a motorcycle onto the rack 100 (FIG. 1).

Figure 15:
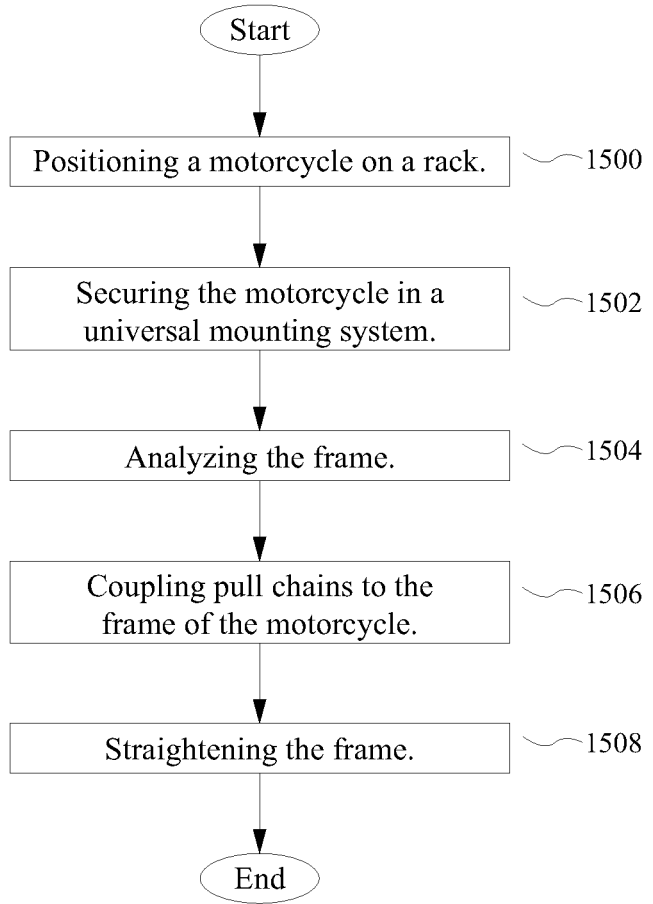
FIG. 15 illustrates a flowchart of a method of using the rack according to some embodiments.

FIG. 15 illustrates a flowchart of a method of using the rack according to some embodiments. In the step 1500, a motorcycle is positioned on the rack. Positioning is able to be by driving or pushing the motorcycle onto the rack utilizing a ramp, or using a dolly to push the motorcycle on the rack, or any other means. In the step 1502, the motorcycle is secured in the universal mounting system. The universal mounting system is able to be implemented in any manner to receive any type of motorcycle and secure the motorcycle in place to enable frame adjustment to be performed. In the step 1504, the frame of the motorcycle is analyzed with the measuring system. The analysis of the frame is able to be performed using any method including a laser measuring system which compares original specifications of the frame with measured specifications. In another implementation, the frame is analyzed using a manual tool such as a straight edge. In the step 1506, chains are coupled to the frame. The chains are coupled in an appropriate configuration based on the damage of the frame. For example, if a frame is bent such that the frame needs to be straightened slightly, the chains are positioned at either end of the frame to enable pulling of the frame which will straighten the frame. In another example, if a left arm of a frame is bent, the chains are positioned on the same arm to pull the arm appropriately. In the step 1508, the frame is adjusted using the chains. Adjusting is able to be by automatically or manually moving the towers which are coupled to the chains which then pull the frame accordingly, and/or moving the chains while keeping the towers stationary to pull the frame accordingly. In some embodiments, fewer or more steps are implemented. For example, in some embodiments, one or more parts are removed from the motorcycle before coupling the chains to the frame. In some embodiments, the order of the steps is modified.

Figure 16:
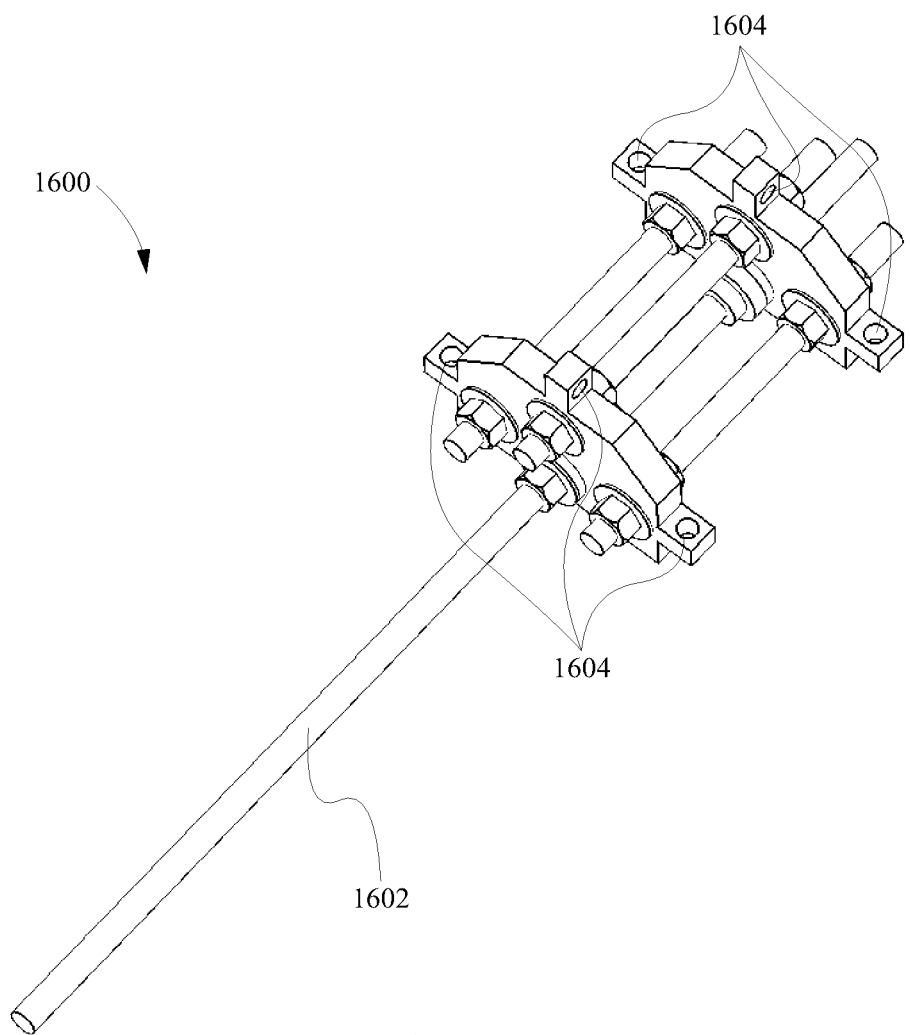
FIG. 16 illustrates a perspective view of a neck puller according to some embodiments.

FIG. 16 illustrates a perspective view of a neck puller according to some embodiments. The neck puller 1600 includes a bar 1602 for insertion into a motorcycle neck as well as one or more pulling points 1604 for coupling chains 110 (FIG. 1) to or any other mechanism for repairing the neck (e.g. by pulling the neck in one or more directions). The bar 1602 provides leverage to facilitate the pulling operation.

Figure 17:
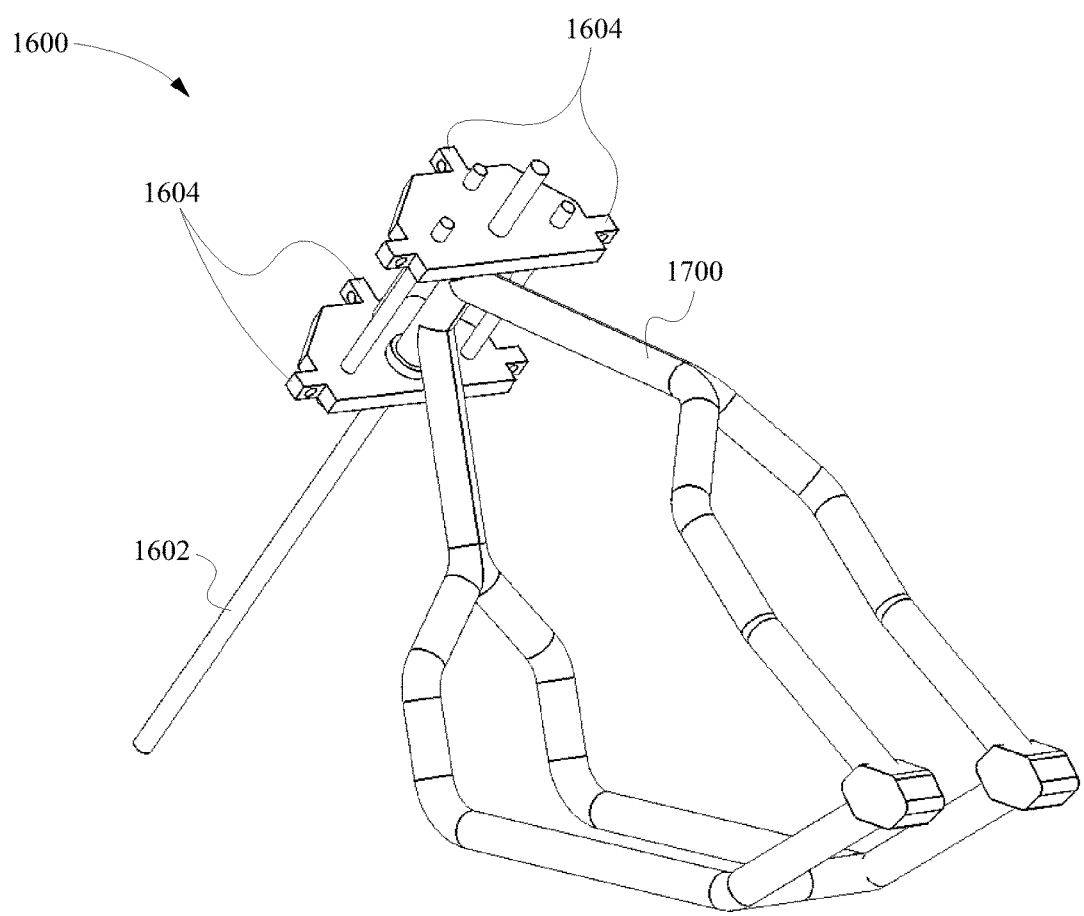
FIG. 17 illustrates a perspective view of a motorcycle frame coupled to a neck puller according to some embodiments.

FIG. 17 illustrates a perspective view of a motorcycle frame coupled to a neck puller according to some embodiments. The neck puller 1600 includes a bar 1602 for insertion into a motorcycle neck as well as one or more pulling points 1604 for coupling chains 110 (FIG. 1) to or any other mechanism for repairing the neck of the motorcycle frame 1700 (e.g. by pulling the neck in one or more directions). The bar 1602 provides leverage to facilitate the pulling operation.

Figure 18:
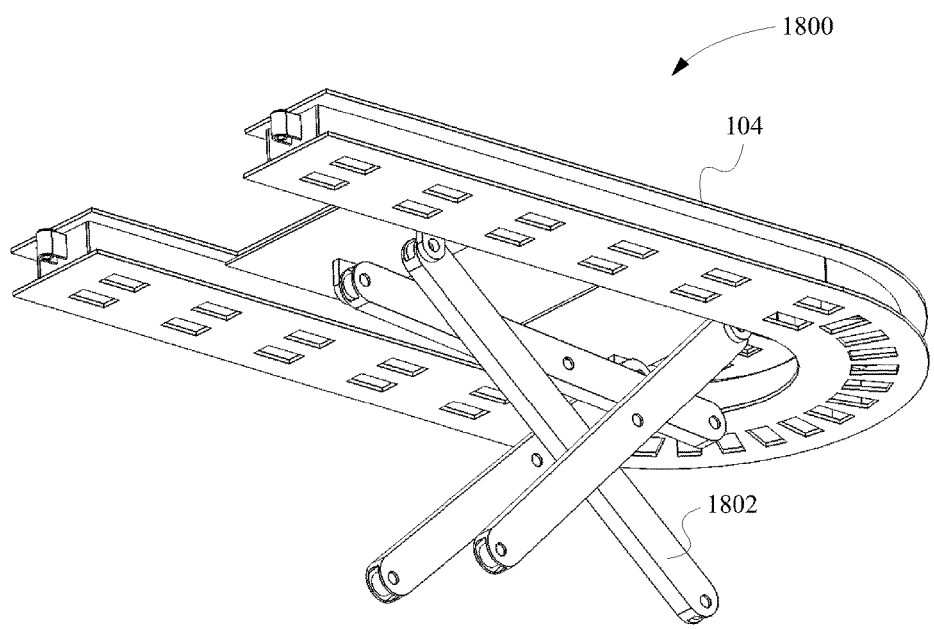
FIG. 18 illustrates a perspective view of a folding rack according to some embodiments.

FIG. 18 illustrates a perspective view of a folding rack according to some embodiments. The folding rack 1800 includes a deck 104 and any of the other components shown herein (e.g., shown in FIG. 1). The folding rack 1800 also includes folding legs 1802 which couple to the deck 104. The folding legs 1802 enable the deck 104 to be raised and lowered to a desired height such as a compact position with the deck 104 lowered completely and an extended position with the deck 104 raised at a maximum. In some embodiments, the legs 1802 are able to fit within a cavity in the deck 104.

Figure 19:
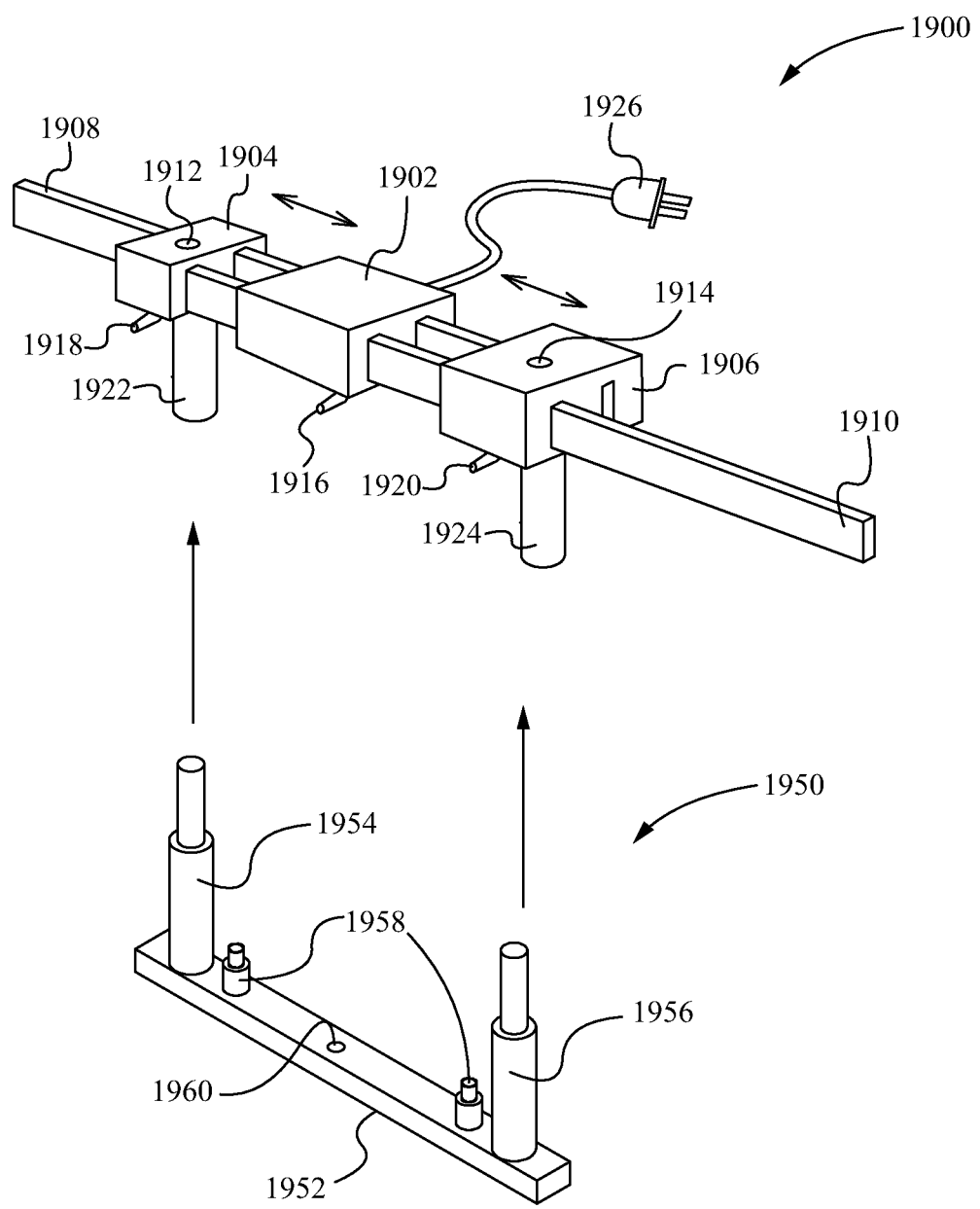
FIG. 19 illustrates a perspective view of a self-centering laser measuring system according to some embodiments.

FIG. 19 illustrates a perspective view of a self-centering laser measuring system according to some embodiments.

The measuring system includes a universal mounting laser device 1900 which includes a central component 1902, a left component 1904 and a right component 1906. The central component 1902 has a first bar 1908 and a second bar 1910 passing through. The first bar 1908 passes through the left component 1904, and the second bar 1910 pass through the right component 1906. The end of the first bar 1908 ends at the right component 1906, and the end of the second bar 1910 ends at the left component 1904. The first bar 1908 and the second bar 1910 are configured to enable the left component 1904 and the right component 1906 to move toward and away from the central component 1902 equally at the same time, thus keeping the cental component 1902 an equal distance from the left component 1904 and the right component 1906 at all times. Therefore, the universal mounting laser device 1900 is self centering. In some embodiments, a mechanism or motor is contained within the central component 1902 for ensuring the left component 1904 and the right component 1906 move toward and away from the central component 1902 equally at the same time. The left component 1904 includes a first mounting hole 1912, and the right component 1906 includes a second mounting hole 1914. The mounting holes 1912, 1914 are configured to receive mounting rods 1954, 1956, respectively. The central component 1902 includes a center laser 1916, the left component 1904 includes a left laser 1918 and the right component 1906 includes a right laser 1920. The center laser 1916 is able to rotate and point to the center of the motorcycle width-wise. The left laser 1918 and the right laser 1920 are able to rotate and point to targets of the motorcycle frame. The lasers enable a user to view or measure any defects or problems with the chassis/frame (e.g., a bent frame) of the motorcycle which are then able to be corrected using the rack system described herein. A power source 1926 is included to power the lasers 1916, 1918, 1924. In some embodiments, the power source 1926 includes a cord and plug for receiving power through a power outlet, a battery (e.g., a 1A 18650 lithium ion battery with a charger), a solar cell, and/or any other power source/receiving device.

A mounting bracket 1950 is motorcycle-specific, designed/sized to fit on a specific motorcycle. For example, the mounting bracket 1950 is wider for a wider motorcycle and narrower for a narrower motorcycle. The mounting bracket includes a base 1952, a first mounting rod 1954, a second mounting rod 1956, spacers 1958 and a central point 1960. The spacers 1958 are used to mount the mounting bracket onto symmetrical mounting points on the motorcycle under the seat. The central point 1960 is able to be used to center the universal mounting laser device 1900 using the center laser 1916. As described above, the first mounting rod 1954 and the second mounting rod 1956 are used to couple the universal mounting laser device 1900 to the mounting bracket 1950 by insertion into the mounting holes 1912, 1914. The universal mounting laser device 1900 is able to expand or contract so that the mounting holes 1912 and 1914 are able to be placed on the motorcycle-specific mounting rods 1954 and 1956.

Figure 20:
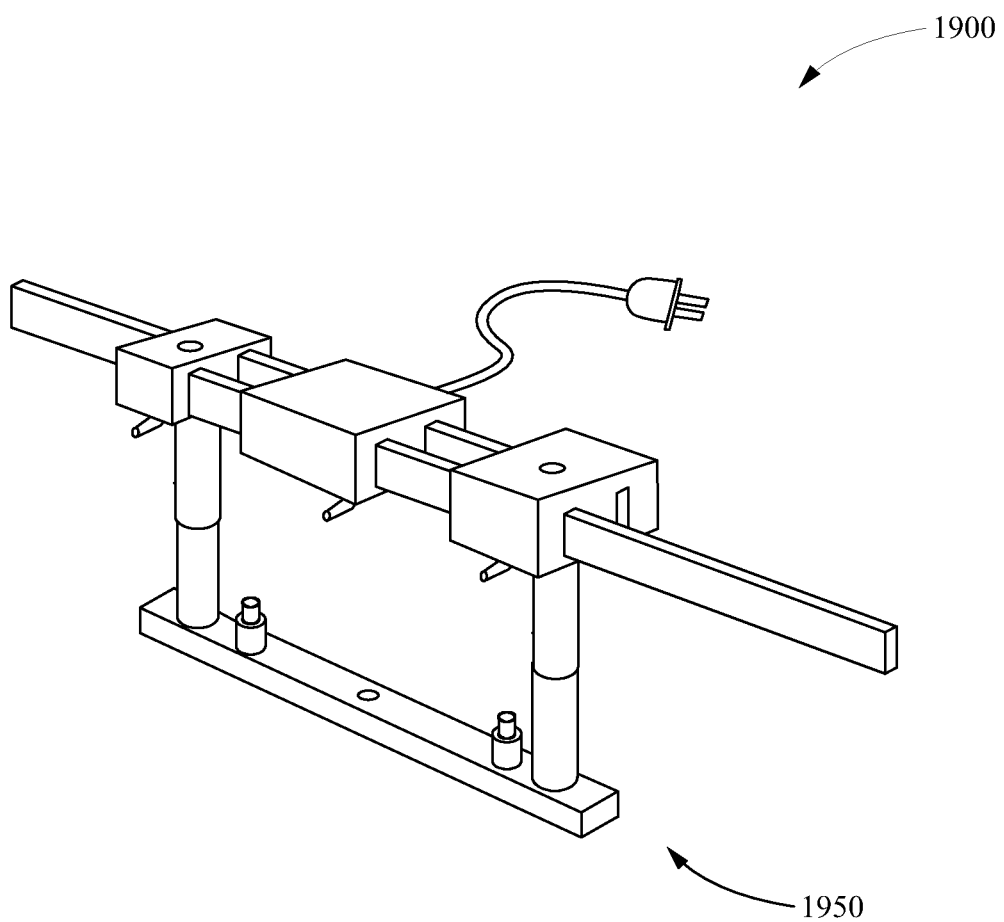
FIG. 20 illustrates a perspective view of a self-centering laser measuring system according to some embodiments.

FIG. 20 illustrates a perspective view of a self-centering laser measuring system according to some embodiments. The universal mounting laser device 1900 and the mounting bracket 1950 are shown coupled together.

Figure 21:
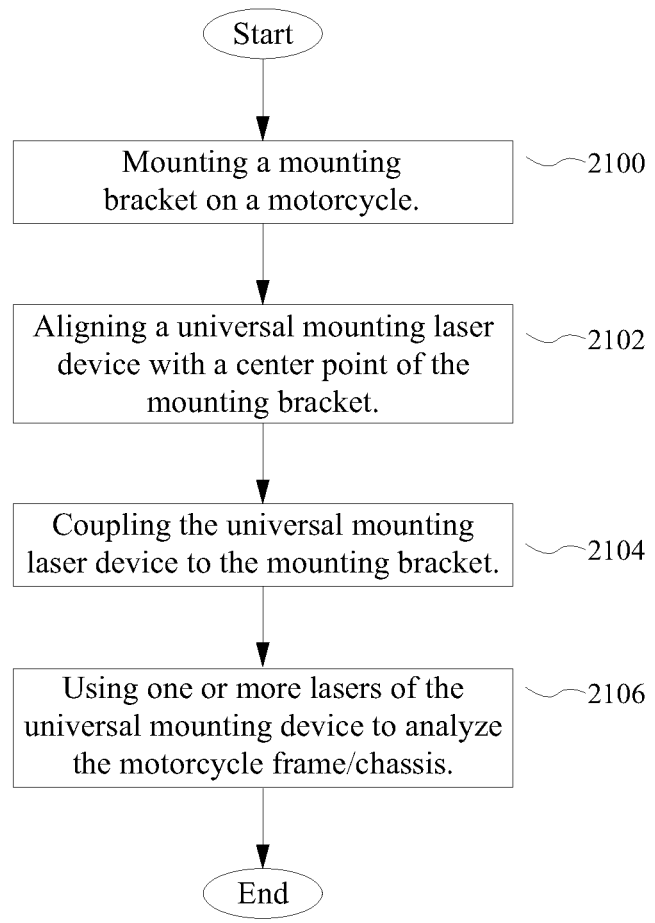
FIG. 21 illustrates a flowchart of a method of using the self-centering laser measuring system according to some embodiments.

FIG. 21 illustrates a flowchart of a method of utilizing the self-centering laser measuring system according to some embodiments. In the step 2100, a mounting bracket is mounted on a motorcycle (e.g., mounted to mounting points under a seat of the motorcycle). In the step 2102, the universal mounting laser device is lined up with the center point of the mounting bracket. In the step 2104, the universal mounting laser device is coupled to the mounting bracket by insertion of the mounting rods of the mounting bracket into mounting holes of the universal mounting laser device. The universal mounting laser device is expanded or contracted to a size so that the holes align with the mounting rods. The expansion and contraction are able to be performed by manually pulling the left and right components of the universal mounting laser device apart or pushing them together. In some embodiments, a motor automatically expands or contracts universal mounting laser device. In the step 2106, one or more lasers of the universal mounting laser device are used to analyze the motorcycle frame/chassis. The lasers are rotatable (e.g., the center laser rotates so that the laser points from the neck of the bike to the rear of the bike to detect any offsets from the center such as due to a bent frame, and the left and right lasers rotate to targets to detect any damage in the frame/chassis). In some embodiments, after the damage to the motorcycle frame/chassis is determined, the frame/chassis is repaired using the rack as described herein. The universal mounting laser device is able to be used before, during and/or after the repair process to ensure the frame/chassis is repaired properly (e.g., repaired to the original specifications). In some embodiments, fewer or more steps are implemented. In some embodiments, the order of the steps is modified.

Figure 23:
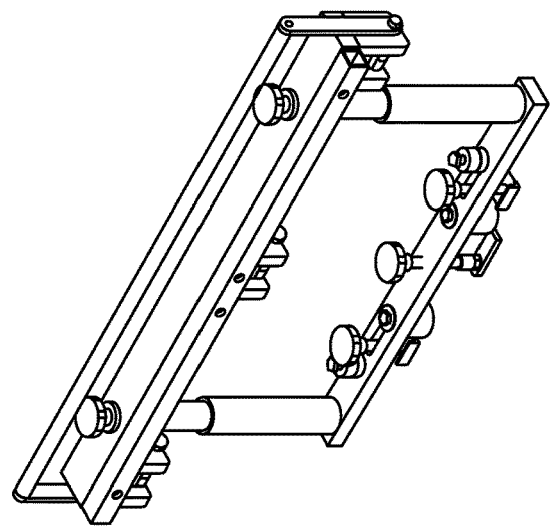
FIG. 23 illustrates a perspective view of a self-centering laser measuring system according to some embodiments.
Figure 22:
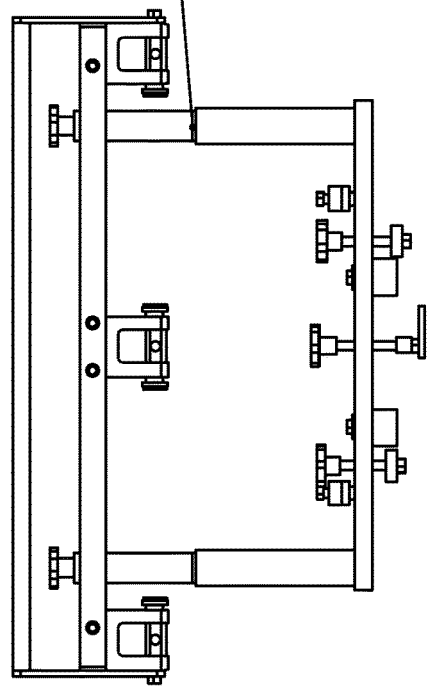
FIG. 22 illustrates a front view of a self-centering laser measuring system according to some embodiments.

FIG. 22 illustrates a front view of a self-centering laser measuring system according to some embodiments. As described herein, the self-centering laser measuring system includes multiple lasers for measuring and aligning the motorcycle frame. The laser measuring system also includes a mounting bracket which is configured to mount to a motorcycle. The mounting device is configured to couple with a self-centering laser device. FIG. 23 illustrates a perspective view of a self-centering laser measuring system according to some embodiments.

Figure 24:
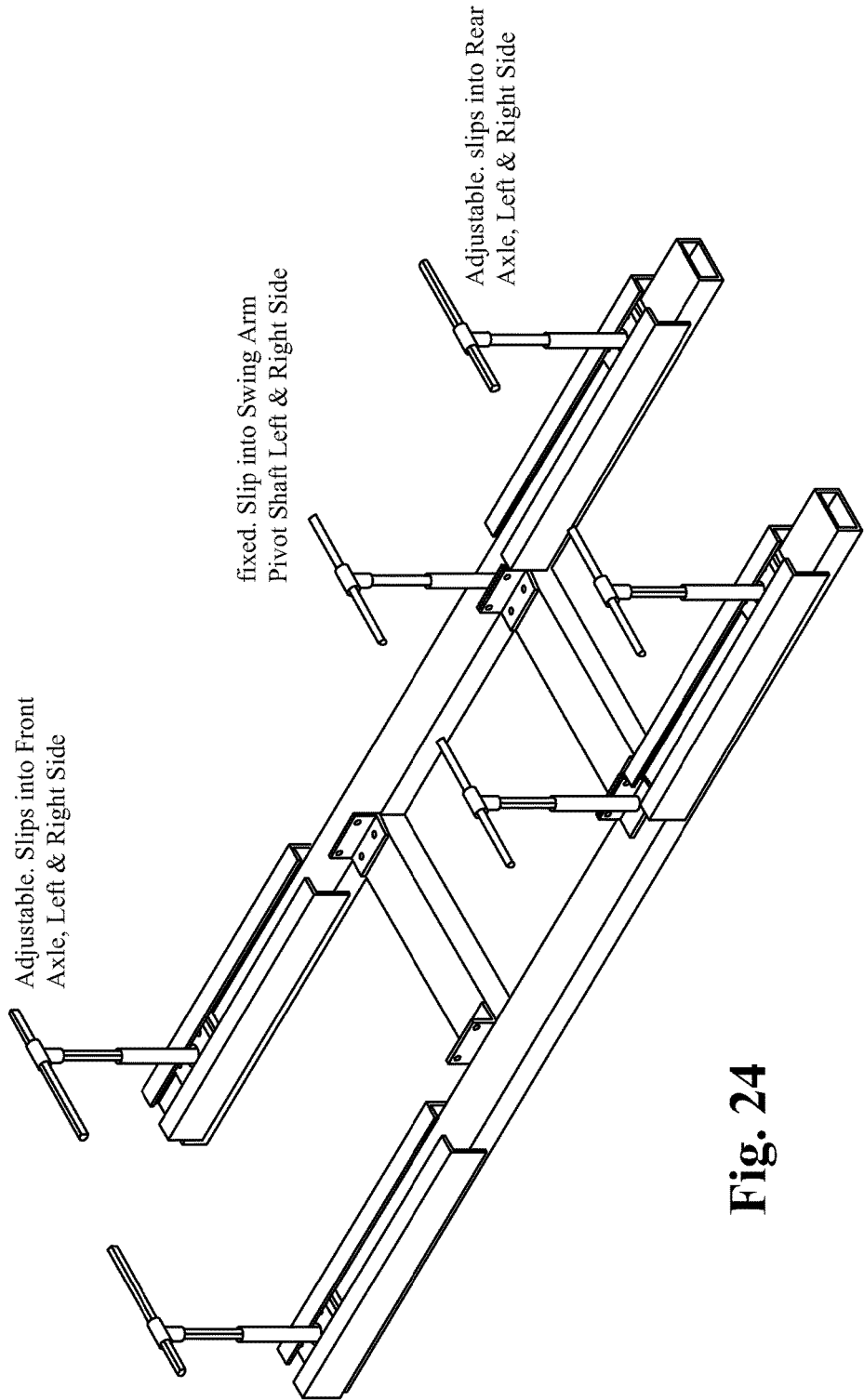
FIG. 24 illustrates a perspective view of an alignment system according to some embodiments.

FIG. 24 illustrates a perspective view of an alignment system according to some embodiments. The alignment system includes a pair of front end bars which are adjustable and are configured for insertion into a front axle from the left and right side. The front end bars are configured perpendicular to vertical rods which are positioned on a track within the front of a base structure. The alignment system also includes a pair of fixed bars which fit into the swing arm pivot shaft and two rear adjustable arms which fit on/in the rear axle of a motorcycle. The fixed bars are also on the left and right side, and are coupled to the base structure. A pair of rear end bars are included with the alignment system. The rear end bars are adjustable and are configured for insertion into a rear axle from the left and right side. The rear end bars are configured perpendicular to vertical rods which are positioned on a track within the rear of the base structure. The alignment system is able to measure the height and length from front to rear on the left and right side on the motorcycle at axles and pivot points to ensure proper alignment. There are measurement scales on each adjustable bar and fixed bar to achieve the same dimensions in length and height on the left and right side of a motorcycle. The alignment system is able to be used on the ground as a stand-alone device. The alignment system is able to be used with the rack described herein. The alignment system is able to be used with any motorcycle service lift.

Figure 25:
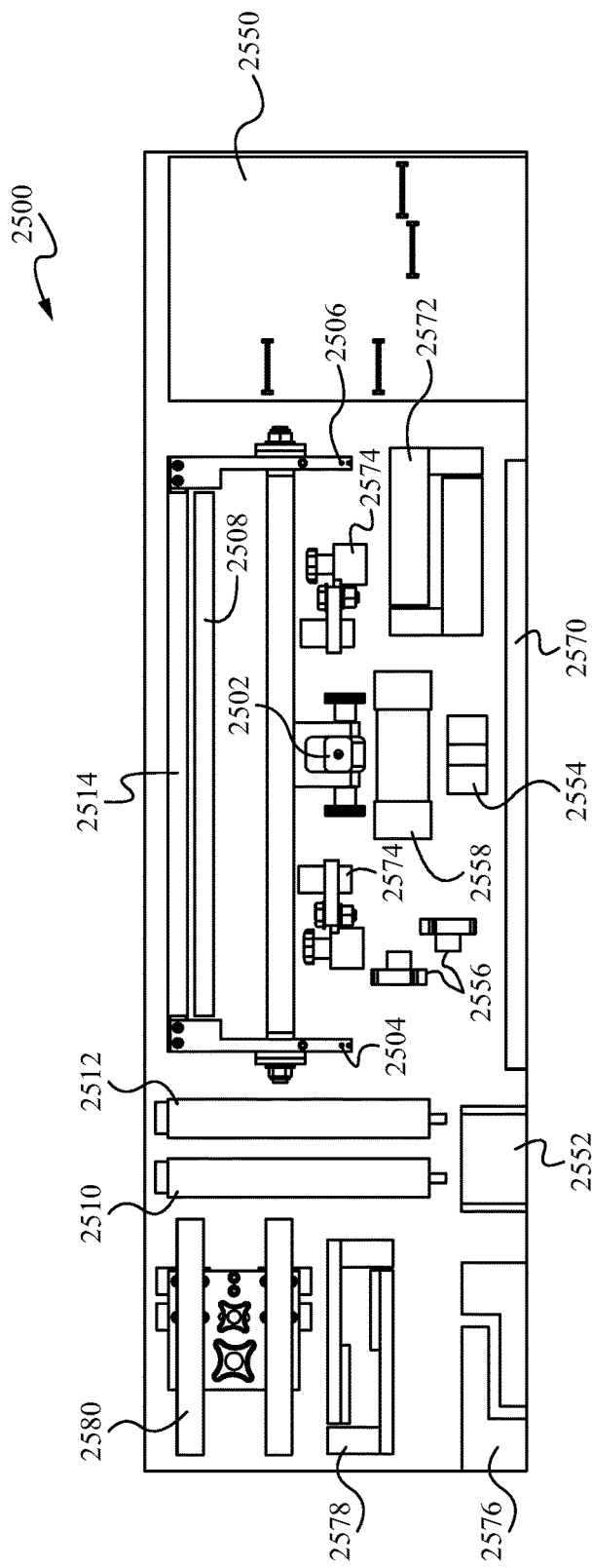
FIG. 25 illustrates a front view of components of a laser measuring system according to some embodiments.

FIG. 25 illustrates a front view of components of a laser measuring system according to some embodiments. The laser measuring system 2500 is similar to the laser measuring system of FIGS. 22 and 23. The laser measuring system 2500 includes a center laser 2502, a first outer laser 2504 and a second outer laser 2506. The laser measuring system 2500 also includes a lower laser bar 2508, a first vertical laser bar mounting rod 2510, a second vertical laser bar mounting rod 2512 and a laser mounting bar 2514.

Also included with the laser measuring system 2500 are additional components such as a box 2550 for mounting brackets, targets and hardware, a battery charger 2552 for a cordless implementation, a tape measure 2554, mounting knobs 2556, and center triple tree targets, hardware and container 2558.

In some embodiments, there are specialized measuring mounts to measure the neck, shock mounts, swing arm, and frame mounts of the frame to determine if the frame is bent such as a validation bar 2570 for softtails and swingarm shocks, upper shock mount validation brackets 2572, one or more swing arm target mounts 2574, validation bar bracket assembly 2576 for the validation bar 2570, softtail side mount validation brackets 2578 and a lower tree mount assembly 2580 (also referred to as a universal neck target mounting system).

Figure 26:
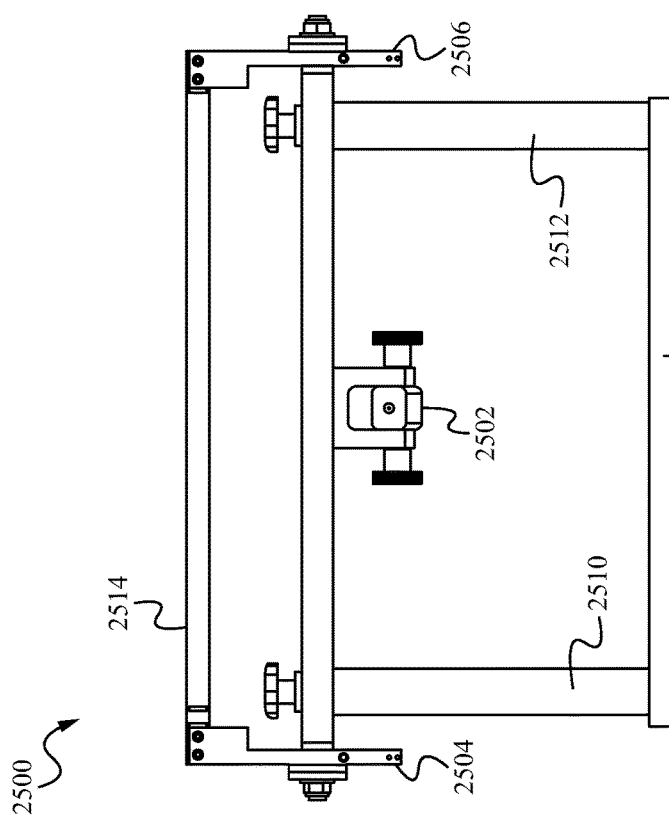
FIG. 26 illustrates a front view of a laser measuring system according to some embodiments.

FIG. 26 illustrates a front view of a laser measuring system according to some embodiments. The laser measuring system 2500 includes a center laser 2502, a first outer laser 2504 and a second outer laser 2506. In some embodiments, fewer or additional lasers are implemented. The laser measuring system 2500 also includes a lower laser bar 2508 which mounts to the center of any motorcycle with various mounting brackets designed to mount to a specific motorcycle. A first vertical laser bar mounting rod 2510 and a second vertical laser bar mounting rod 2512 are utilized to mount the laser mounting bar 2514. For example, the laser mounting bar 2514 couples to the lower laser bar 2508 with the first vertical laser bar mounting rod 2510 and the second vertical laser bar mounting rod 2512. The center laser 2502 is positioned in the horizontal center of the laser mounting bar 2514. On the sides of the laser mounting bar 2514 are the first outer laser 2504 and the second outer laser 2506. In some embodiments, the laser mounting bar 2514 includes a handle which rotates the outer lasers 2504, 2506 from the front to the rear of the motorcycle, and a second bar which includes the center laser 2502 and couples to the lower laser bar 2508 with the first vertical laser bar mounting rod 2510 and the second vertical laser bar mounting rod 2512. For example, when a user pushes the handle forward the outer lasers 2504, 2506 move backward. In some embodiments, the handle rotates the outer lasers 2504, 2506 from the rear to the front of the motorcycle. In some embodiments, the center laser 2502 rotates from the front to the rear of the motorcycle independent of the outer lasers 2504, 2506 using knobs on the left and/or right side of the center laser housing (or other implementations to rotate the center laser 2502). In some embodiments, the center laser 2502 moves based on the movement of the handle or independently of the handle (e.g., the laser is rotatable by pushing the laser). In some embodiments, any of the lasers are movable using motorized capabilities, for example, a motor is contained within the laser mounting bar 2514 with the appropriate hardware (e.g., gears, cables, joints, hinges) to rotate the lasers. The two outer laser dots hit various targets with scales mounted to the motorcycle, and the center laser points to the center of the motorcycle frame to validate the frame is straight and suspension is aligned. In some embodiments, the laser measuring system 2500 is corded, and in some embodiments, the laser measuring system 2500 is cordless. For example, the laser measuring system 2500 includes a removable battery pack in the laser mounting bar 2514.

Figure 27:
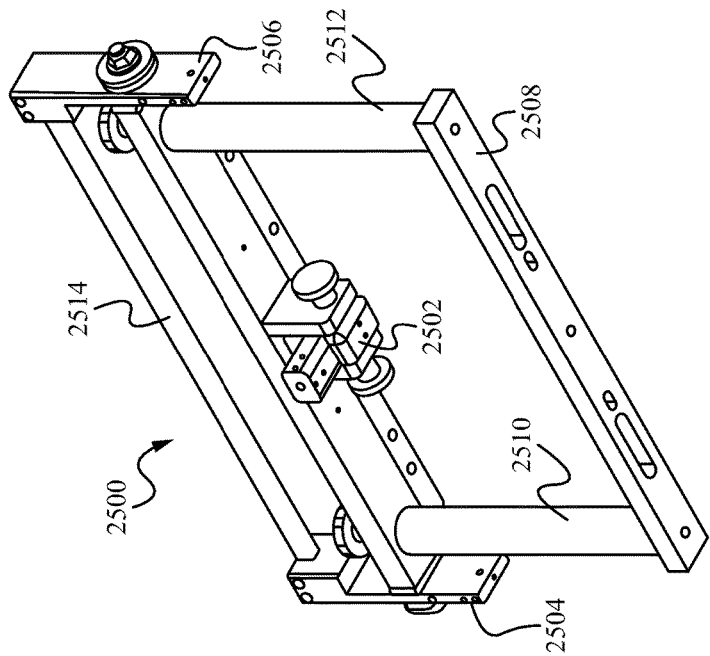
FIG. 27 illustrates a bottom perspective view of a laser measuring system according to some embodiments.

FIG. 27 illustrates a bottom perspective view of a laser measuring system according to some embodiments. As described herein, the laser measuring system 2500 includes a center laser, a first outer laser 2504 and a second outer laser 2506 which are positioned appropriately on a laser mounting bar 2514. A lower laser bar 2508 mounts to a motorcycle and couples to the laser mounting bar 2514 using a first vertical laser bar mounting rod 2510 and a second vertical laser bar mounting rod 2512. Any of the mounting implementations described herein are able to be used to mount the laser measuring system 2500 to the motorcycle. For example, several components of the laser measuring system 2500 are universal which couple to motorcycle-specific components.

As mentioned in FIG. 25, the laser measuring system includes a lower tree mount assembly 2580.

Figure 28:
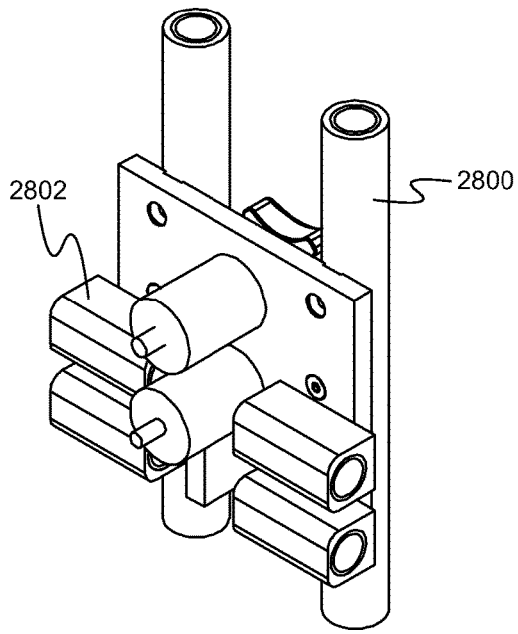
FIG. 28 illustrates a perspective view of the lower tree mount assembly according to some embodiments.

FIG. 28 illustrates a perspective view of the lower tree mount assembly according to some embodiments. The lower tree mount assembly 2580 includes a plurality (e.g., 2) of long tubes 2800 for targets to validate the bracket/assembly is centered on the frame of the motorcycle. For example, lasers are able to go through the long tubes 2800 to a target which is positioned to ensure the lower tree mount assembly 2580 is centered on the frame. The lower tree mount assembly 2580 includes a plurality (e.g., 4) of short tubes 2802 for long targets that the laser dot shines on/through to diagnose frame damage and validate that the frame is bent or not. In some embodiments, the long tubes 2800 and short tubes 2802 are hollow to enable the laser to pass through to a target.

Figure 29:
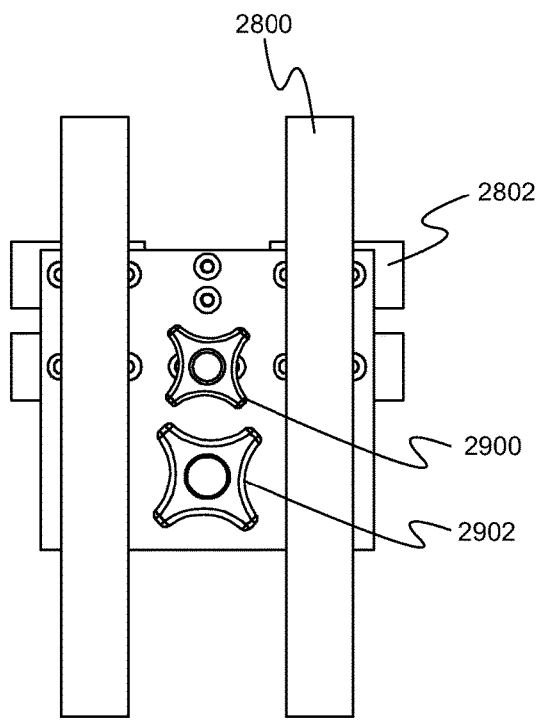
FIG. 29 illustrates a rear view of the lower tree mount assembly according to some embodiments.

FIG. 29 illustrates a rear view of the lower tree mount assembly according to some embodiments. The lower tree mount assembly 2580 also includes a first knob 2900 and a second knob 2902 for securing the lower tree mount assembly 2580 to the motorcycle frame. For example, the first knob 2900 and the second knob 2902 are configured to attach to the bottom of the triple tree of the motorcycle. Although two knobs are shown, a single knob is able to be used, or another securing/adjusting mechanism is able to be used. In some embodiments, the lower tree mount assembly 2580 is magnetic. For example, the lower tree mount assembly 2580 includes one or more magnets to affix to the motorcycle frame.

Figure 30:
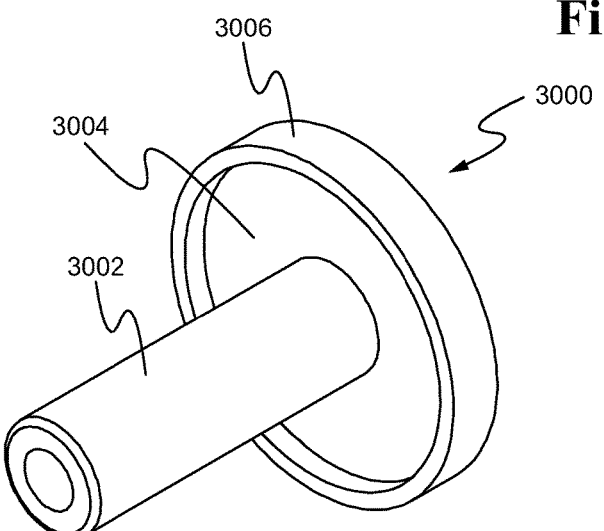
FIG. 30 illustrates a perspective view of a universal magnet neck bracket according to some embodiments.

FIG. 30 illustrates a perspective view of a universal magnet neck bracket according to some embodiments. The universal magnet neck bracket 3000 includes a shaft 3002, a magnet 3004 and a base 3006, where the magnet 3004 fits over the shaft 3002 and sits on the base 3006. The universal magnet neck bracket 3000 is configured to receive a threaded knob (e.g., the first knob 2900 or the second knob 2902) of the lower tree mount assembly 2580 to secure the lower tree mount assembly 2580 to the universal magnet neck bracket 3000 which are then attached to the motorcycle frame (e.g., using the magnet 3004) to be used with the laser measuring system to measure the lower neck of the motorcycle frame. Other configurations of the universal magnet neck bracket 3000 are possible.

Figure 31:
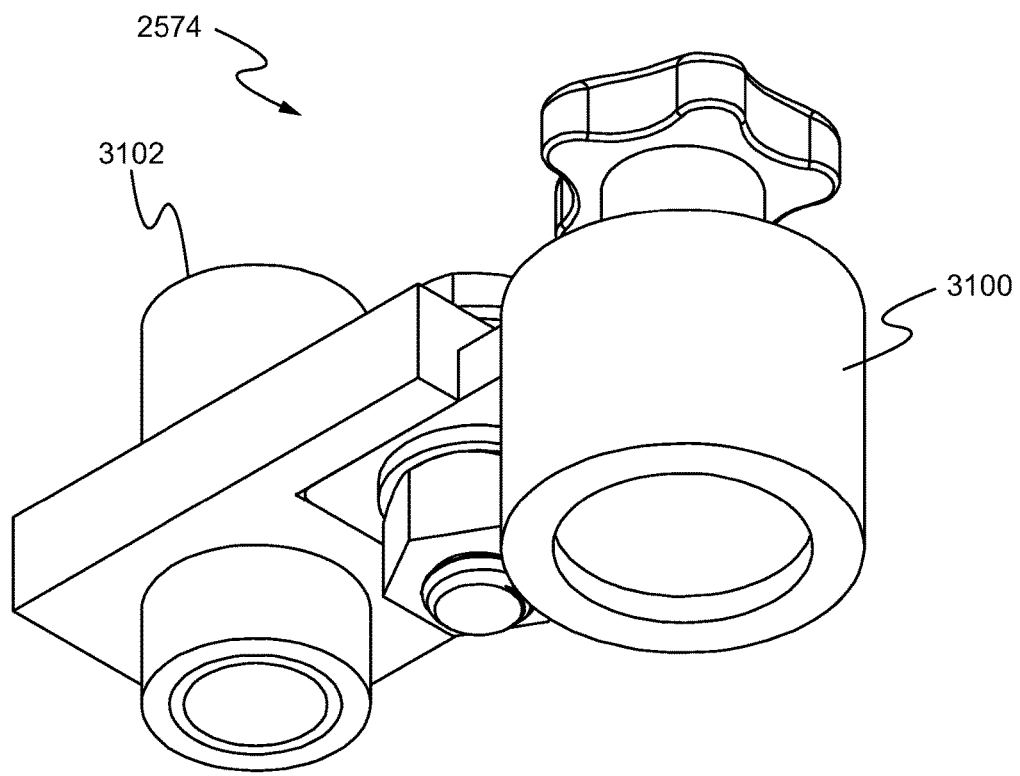
FIG. 31 illustrates a perspective view of a target mount assembly according to some embodiments.

FIG. 31 illustrates a perspective view of a target mount assembly according to some embodiments. The target mount assembly 2574 includes a magnetic component 3100 and a tube 3102. The magnetic component 3100 is able to include a knob for adjusting the magnetic component 3100. The tube 3102 is configured to receive a short or a long target which is used to determine alignment/measurements of the motorcycle frame. The laser measuring system is able to utilize the target mount assembly 2574 as a target to measure and analyze motorcycle components such as the frame.

Figure 32:
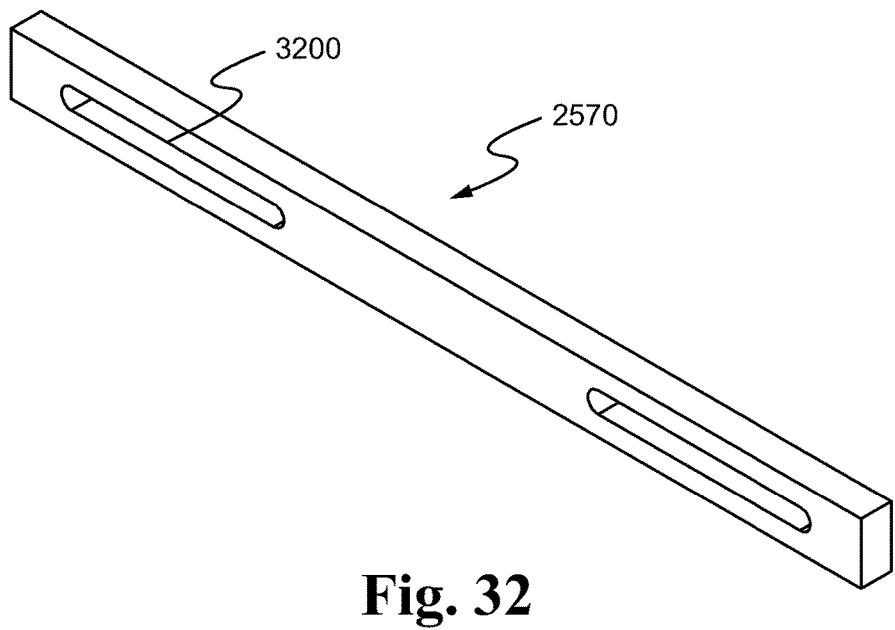
FIG. 32 illustrates a perspective view of a validation bar according to some embodiments.

FIG. 32 illustrates a perspective view of a validation bar according to some embodiments. The validation bar 2570 is a straight object (e.g., bar, rectangular box) with one or more elongated holes 3200. The validation bar 2570 is attached to the motorcycle frame using brackets at the appropriate locations of the motorcycle frame to determine if there is a bend or deformation in the motorcycle frame. The one or more elongated holes 3200 allow for variations in size/length of a motorcycle frame.

Figure 33:
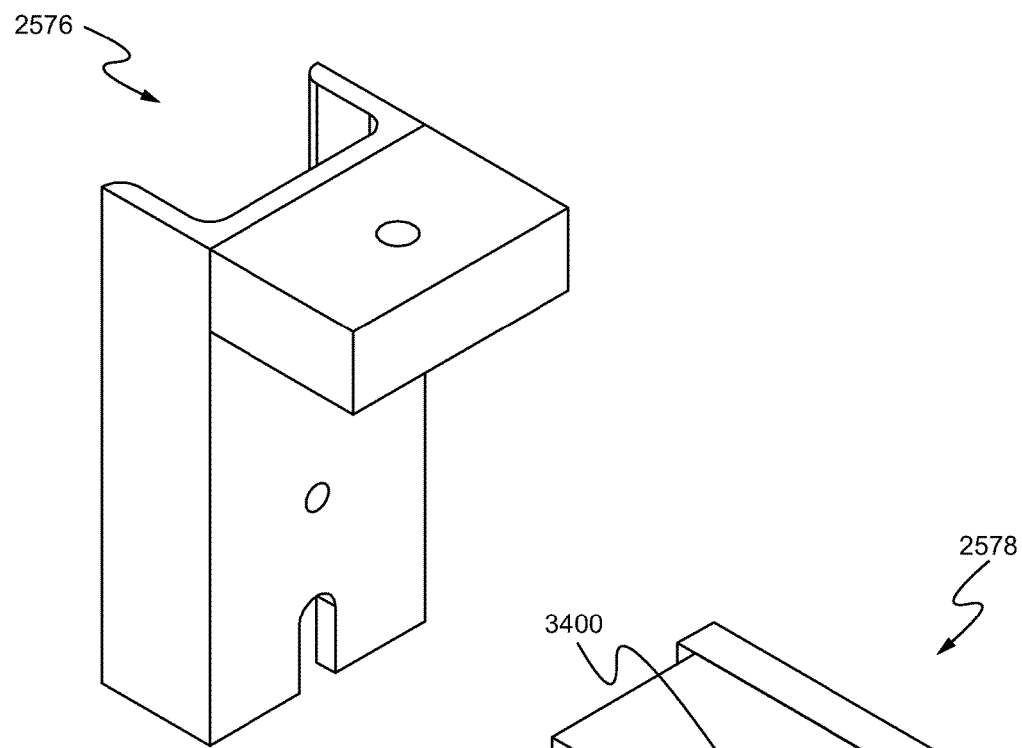
FIG. 33 illustrates a perspective view of a validation bar bracket assembly according to some embodiments.

FIG. 33 illustrates a perspective view of a validation bar bracket assembly according to some embodiments. The validation bar bracket assembly 2576 is used to attach the validation bar 2570 using a knob or other device to secure the validation bar 2570 for measuring the motorcycle frame.

Figure 34:
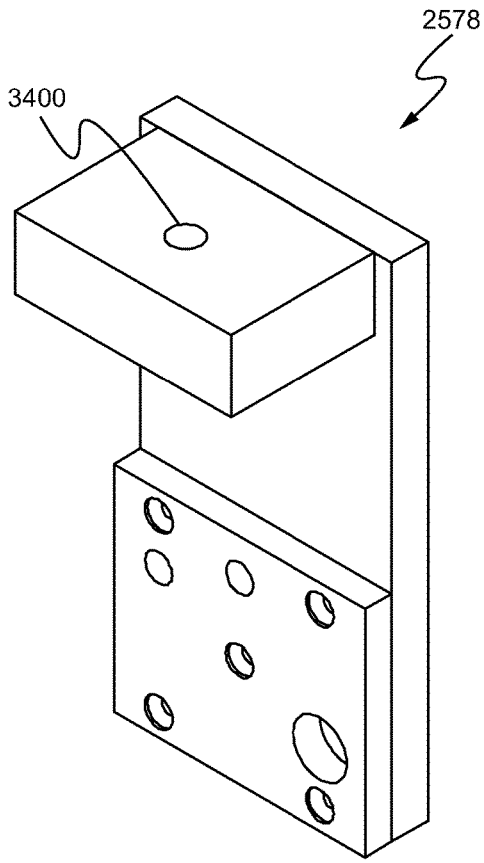
FIG. 34 illustrates a perspective view of a soft tail side mount assembly according to some embodiments.

FIG. 34 illustrates a perspective view of a soft tail side mount assembly according to some embodiments. A soft tail side mount assembly 2578 is used to attach the validation bar 2570 using a knob or other device to secure the validation bar 2570 for measuring the motorcycle frame. The soft tail side mount assembly 2578 includes a hole 3400 for receiving the validation bar to mount with knobs on the left and right side of the motorcycle to ensure the laser measuring system is centered and straight on the motorcycle for accurate measurement. The soft tail side mount assembly 2578 also includes a second hole 3402 for a spacer for the left or right side of motorcycle, and the soft tail side mount assembly 2578 bolts to the frame, through rear fender struts on the left and right sides. Additionally, the soft tail side mount assembly 2578 is reversible to fit the left and right side of the motorcycle.

Figure 35:
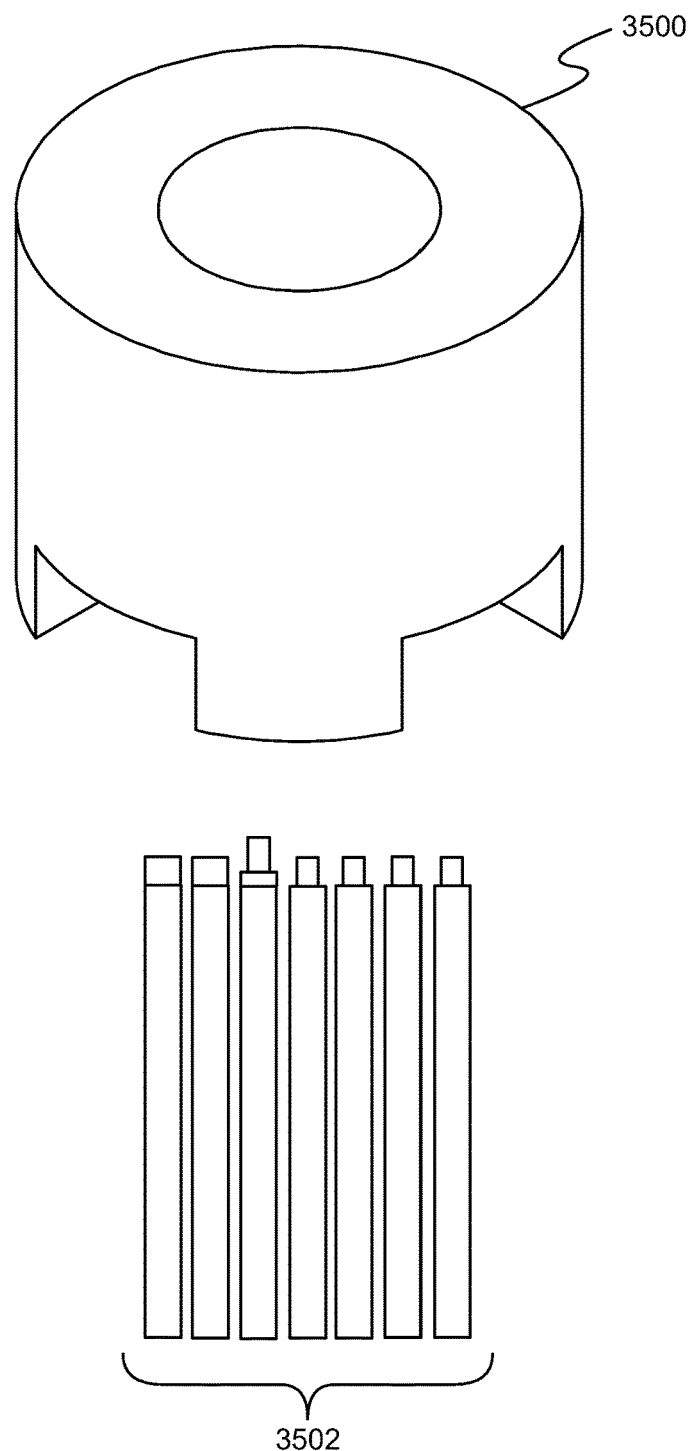
FIG. 35 illustrates a perspective view of a target tip according to some embodiments.

FIG. 35 illustrates a perspective view of a target tip according to some embodiments. The target tip 3500 is configured to be placed on a motorcycle to obtain laser accurate measurements. The target tip 3500 is able to be any target tip such as a diatech target glue tip. The target tip 3500 is attached to the motorcycle frame, chassis, suspension swingarm, or wheels of a motorcycle using hot glue (or another adhesive) to obtain laser accurate measurements to see if the wheels are centered on the motorcycle and/or to check other elements of the motorcycle. Before or after the target tip 3500 is attached to the motorcycle frame, a target 3502 (e.g., short target (8 inch) or long target (12 inch)) attaches to the target tip 3500 by screwing in (or another coupling implementation). The laser measurement system described herein is able to be used with the target tip 3500/target 3502 to check the front and rear wheels for center line, camber issues and toe in toe out issues as well as frame damage on all motorcycle frames. The analysis of the motorcycle components includes visual confirmation of the analysis (e.g., a user is able to see that the frame is aligned or not based on the laser dot and the target tip 3500). The target tip 3500 is able to be any shape/configuration, for example, a round shape with a cross-bottom and an aperture in the top configured for receiving the target 3502.

The laser measuring system and the self-centering laser measuring systems are able to be utilized as stand alone measuring systems, and are able to be used in conjunction with a motorcycle frame repair system (e.g., the rack) for motorcycle frame repair).

Figure 36:
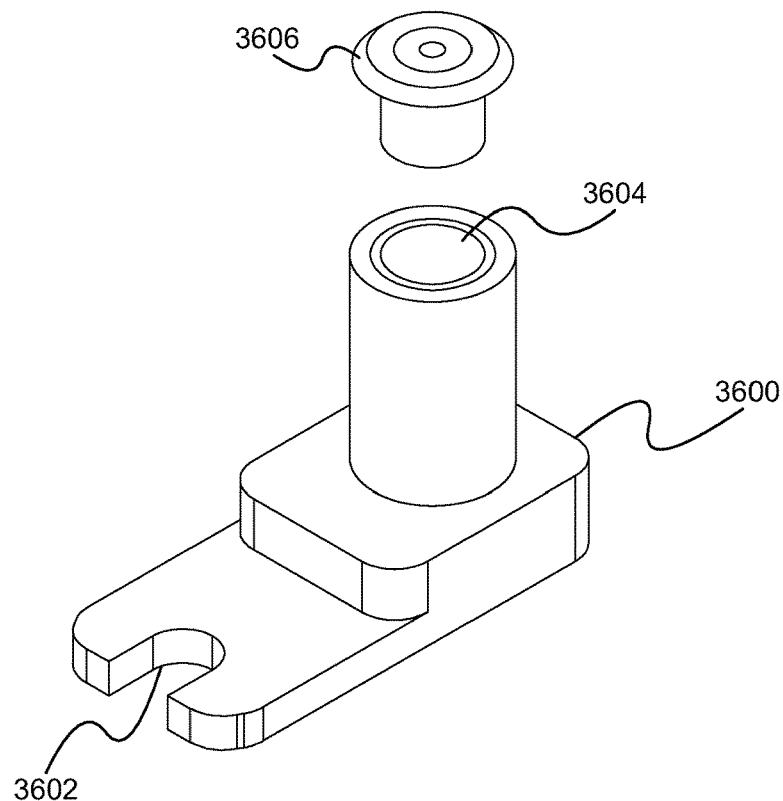
FIG. 36 illustrates a perspective view of a shock target mount according to some embodiments.

FIG. 36 illustrates a perspective view of a shock target mount according to some embodiments. The shock target mount 3600 is used to measure to validate a motorcycle swing is properly aligned with the frame of the motorcycle. Laser dots from the laser measuring system as described herein (or another laser system) point to targets 3606 which are attached to or part of the shock target mount 3600. For example, a target 3606 slides into a cylindrical tube 3604 of the shock target mount 3600. The shock target mounts 3600 and the targets 3606 are used to measure mis-aligned rear suspension and frame damage.

The shock target mount 3600 includes a groove 3602 (or other implementation/configuration) to enable the shock target mount 3600 to fit on a shock bolt of the motorcycle. The shock target mount 3600 also includes the cylindrical tube 3604 (or other shape) which receives the target 3606. The target 3606 is able to be any shape or type of target such as a reflective target for reflecting the laser back to the laser measuring system.

For example, a shock target mount 3600 is positioned on each rear shock (left and right) of the motorcycle, so that the laser measuring system is able to be implemented to measure the motorcycle frame.

Figure 37:
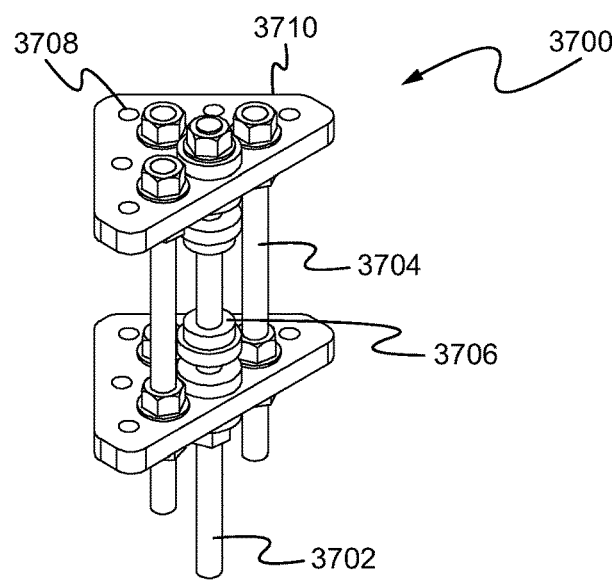
FIG. 37 illustrates a perspective view of a neck puller according to some embodiments.

FIG. 37 illustrates a perspective view of a neck puller according to some embodiments. The neck puller 3700 is similar to the neck puller 1600 of FIG. 16 with some modifications. Specifically, a center neck rod 3702 is shorter, and 3708 holes on the plates 3710 are configured differently. The center neck rod 3702 includes neck race supports 3706 between the plates 3710. Three outer rods 3704 also connect the plates 3710. With the modified design, the neck puller 3700 provides access to better pulling angles.

Figure 38:
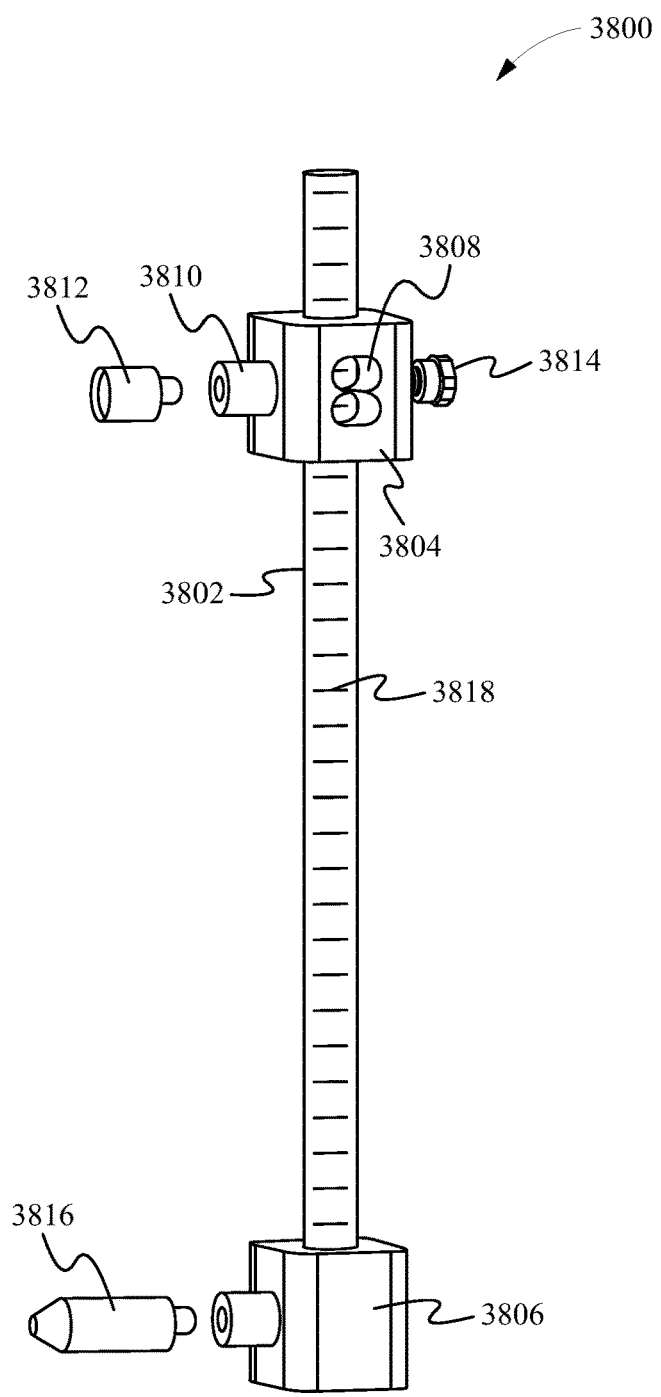
FIG. 38 illustrates a perspective view of a rear shock tram gauge according to some embodiments.

FIG. 38 illustrates a perspective view of a rear shock tram gauge according to some embodiments. The rear shock tram gauge is configured to measure the distance between the upper shock mount and lower shock mount with a slide pointer or bolt cover and a view window. This is useful for many types of motorcycles such as Harley Davidson because when the rear wheel of the motorcycle is raised off the ground by approximately an inch and the lower rear shock system bolts are removed, a user is able to access, and if desired, make a vertical motor alignment adjustment with visual confirmation. This ensures that the engine/swing arm is properly aligned for optimal riding performance and safety.

The rear shock tram gauge 3800 includes a rod 3802, a slider 3804 (e.g., a Delrin or Acetyl slider) and a shock tram gauge cap 3806. The rod 3802 is able to be any type of rod (e.g., an aluminum or steel rod) that is a desired size (e.g., 17.5 inches long) and has scales 3818 that read to 16 inches in ⅛ inch scales (or another size) on both sides, visible through a view window 3808 of the slider 3804. The view window 3808 is able to include a pointer to point at the scales 3818. The rod 3802 has a groove (e.g., 3/16 inch groove) that goes 17 inches (or another length) along the rod 3802 to keep the slider 3804 straight while sliding. For example, the slider 3804 includes a protrusion which is able to fit within the groove (e.g., track) to ensure the slider 3804 slides in a straight line.

The slider 3804 is able to be any slider such as a Delrin or Acetyl slider which slides up and down the rod 3802 and has an arm 3810 to attach a pointer or crown nut adapter 3812. The arm 3810 is an attachment for the crown nut adapter 3812 and/or a pointer adapter (or another adapter). The crown nut adapter 3812 is configured to fit on a crown nut (e.g., on the rear shock) on the motorcycle. The slider 3804 also includes a thumb screw 3814 (e.g., nylon thumb screw) to keep the slider 3804 in place for measuring.

The view window 3808 is an opening or window which enables a user to view scales/markings 3818 on the rod 3802 to take measurements. In some embodiments, there are a plurality of view windows (e.g., on opposing sides of the slider 3804) which line up with the scales 3818 on the rod 3802. In some embodiments, the view window 3808 includes a pointer to assist in lining up the view window 3808 with the scales on the rod 3802.

The shock tram gauge cap 3806 remains stationary and holds the rod 3802 in place. The shock tram gauge cap 3806 receives a lower shock system adapter 3816 which is configured to fit on/in the lower shock system of the motorcycle. In some embodiments, the lower shock system adapter 3816 and the crown nut adapter 3812 are configured to fit into other components/adapters/mounts which are configured to fit in/on the motorcycle.

The rear shock tram gauge 3800 is utilized by mounting the shock tram gauge cap 3806 to the lower shock mount of the motorcycle using the lower shock mount adapter 3816. The user then slides the slider 3804 to align the crown nut adapter 3812 with the upper shock mount of the motorcycle. Once aligned, the user is able to read the scales 3818 on the rod 3802 through the view window 3808 of the slider 3804 to measure the distance between the upper shock mount and the lower shock mount.

The rear shock tram gauge 3800 is able to be used as part of a system to not only measure a motorcycle (e.g., the distance between the upper shock mount and the lower shock mount) but also adjust/fix the motorcycle frame. For example, if the rear shock tram gauge 3800 measures the motorcycle and determines the distance between the upper shock mount and the lower shock mount is not correct, another device such as the rack 100 is able to be used to adjust (e.g., bend, pull) the motorcycle frame until the rear shock tram gauge 3800 measures the correct distance.

In some embodiments, the shape of the rod is round cylindrical or another shape such as a flat bar, rectangular bar and/or any other shape.

Although a motorcycle frame has been described as being repaired using the rack, any device is able to be repaired such as a moped or a scooter.

To utilize the motorcycle frame rack, a motorcycle is positioned on the rack in a universal mounting system. The damage to the frame is determined using a measuring system. Then, chains coupled to towers are coupled to the frame which adjust the frame to the frame's original configuration or at least approximately the original configuration by pulling the frame at the appropriate points and angles.

In operation, the motorcycle frame rack reduces the time and cost of repairing a motorcycle frame by enabling a frame to be repaired without requiring the motorcycle to be taken apart.

Examples of suitable computing devices to be used with the motorcycle frame rack include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad or any other suitable computing device.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A device for measuring a distance between an upper shock mount and a lower shock mount of a motorcycle comprising:
   a. a rod comprising measurement scales;
   b. a slider configured to be positioned on the rod, wherein the slider is used for determining measurement information of the motorcycle;
   c. a cap positioned on the rod, wherein the cap further comprises a lower shock mount adapter configured to fit on/in a lower shock system of the motorcycle, wherein the cap is mounted to the lower shock system of the motorcycle using the lower shock mount adapter and sliding the slider to align a crown nut adapter with an upper shock mount of the motorcycle.

2. The device of claim 1 wherein the scales are on opposite sides of the rod.

3. The device of claim 1 wherein the slider comprises one or more apertures for viewing the scales.

4. The device of claim 1 wherein the slider comprises a plurality of apertures, a first aperture on a first side of the slider and a second aperture on a second side of the slider, wherein the first side is opposite the second side.

5. A method of measuring a distance between an upper shock mount and a lower shock mount of a motorcycle comprising:
   a. attaching a measuring device to the motorcycle, the measuring device comprising:
      i. a rod comprising measurement scales;
      ii. a slider configured to be positioned on the rod; and
      iii. a cap positioned on the rod, wherein the cap further comprises a lower shock mount adapter configured to fit on/in a lower shock system of the motorcycle, wherein attaching the measuring device includes: mounting the cap to the lower shock system of the motorcycle using the lower shock mount adapter and sliding the slider to align a crown nut adapter with an upper shock mount of the motorcycle; and
   b. moving the slider along the rod to measure the motorcycle.

6. The method of claim 5 wherein attaching the measuring device to the motorcycle includes attaching a lower shock mount adapter to the cap and to the motorcycle, and moving the slider to attach the slider to the motorcycle.

7. The method of claim 5 wherein the slider includes one or more apertures configured for enabling viewing the measurement scales on the rod.

8. A system comprising:
   a. a measuring device comprising:
      i. a rod comprising measurement scales;
      ii. a slider configured to be positioned on the rod, wherein the slider is used for determining measurement information of the motorcycle; and
      iii. a cap positioned on the rod, wherein the cap further comprises a lower shock mount adapter configured to fit on/in a lower shock system of the motorcycle, wherein the cap is mounted to the lower shock system of the motorcycle using the lower shock mount adapter and sliding the slider to align a crown nut adapter with an upper shock mount of the motorcycle; and
   b. a device configured to adjust a frame of the motorcycle based on the measurement information of the motorcycle.

9. The system of claim 8 wherein the measurement scales are on opposite sides of the rod.

10. The system of claim 9 wherein the slider comprises a plurality of apertures, a first aperture on a first side of the slider and a second aperture on a second side of the slider, wherein the first side is opposite the second side.

11. The system of claim 8 wherein the slider comprises one or more apertures for viewing the measurement scales.

* * * * *